US010387064B2

(12) United States Patent
Kim

(10) Patent No.: US 10,387,064 B2
(45) Date of Patent: Aug. 20, 2019

(54) STORAGE DEVICE, HOST COMMUNICATING WITH THE STORAGE DEVICE, AND ELECTRONIC DEVICE INCLUDING THE STORAGE DEVICE

(71) Applicant: SAMSUNG ELECTRONICS CO., LTD., Suwon-si, Gyeonggi-Do (KR)

(72) Inventor: Ji-Soo Kim, Seongnam-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 71 days.

(21) Appl. No.: 15/273,821

(22) Filed: Sep. 23, 2016

(65) Prior Publication Data
US 2017/0102895 A1 Apr. 13, 2017

(30) Foreign Application Priority Data

Oct. 13, 2015 (KR) .......................... 10-2015-0143052

(51) Int. Cl.
*G06F 3/06* (2006.01)
(52) U.S. Cl.
CPC .......... *G06F 3/0637* (2013.01); *G06F 3/0604* (2013.01); *G06F 3/0622* (2013.01); *G06F 3/0634* (2013.01); *G06F 3/0644* (2013.01); *G06F 3/0659* (2013.01); *G06F 3/0679* (2013.01)

(58) Field of Classification Search
None
See application file for complete search history.

(56) References Cited

U.S. PATENT DOCUMENTS

| 5,040,150 | A  | * | 8/1991  | Naitoh ........... G01B 31/318505 |
|           |    |   |         | 365/189.04                      |
| 6,615,355 | B2 |   | 9/2003  | Mattison                        |
| 7,120,771 | B2 |   | 10/2006 | Dahan et al.                    |
| 7,809,862 | B2 |   | 10/2010 | Yu et al.                       |
| 7,849,310 | B2 |   | 12/2010 | Watt et al.                     |
| 8,479,022 | B2 |   | 7/2013  | Dahan et al.                    |
| 8,499,168 | B2 |   | 7/2013  | Chen et al.                     |
| 8,533,856 | B2 |   | 9/2013  | Estakhri et al.                 |
| 8,745,409 | B2 |   | 6/2014  | Teicher et al.                  |
| 8,976,585 | B2 |   | 3/2015  | Ihle et al.                     |
| D736,212  | S  |   | 8/2015  | Kang et al.                     |
| 2009/0222816 | A1 | * | 9/2009 | Mansell ................ G06F 12/145 |
|           |    |   |         | 718/1                           |
| 2010/0250970 | A1 | * | 9/2010 | Ejiri ........................ G06F 21/34 |
|           |    |   |         | 713/193                         |

(Continued)

OTHER PUBLICATIONS

ARM Security Technology, "Building a Secure system using TrustZone Technology,".

*Primary Examiner* — Douglas King
(74) *Attorney, Agent, or Firm* — Volentine, Whitt & Francos, PLLC

(57) ABSTRACT

A storage device includes a connector including a plurality of connection terminals connectable to an external device and a nonvolatile memory including a secure area and a normal area. The secure area is accessible when the secure signal indicates the secure mode, and the normal area is accessible when the secure signal indicates the non-secure mode. One of the plurality of connection terminals corresponds to a secure signal terminal for receiving a secure signal that indicates a secure mode or a non-secure mode.

15 Claims, 27 Drawing Sheets

(56) References Cited

U.S. PATENT DOCUMENTS

| | | |
|---|---|---|
| 2012/0036347 A1 | 2/2012 | Swanson et al. |
| 2012/0265975 A1 | 10/2012 | Kimelman |
| 2014/0122820 A1 | 5/2014 | Park et al. |
| 2014/0250540 A1* | 9/2014 | Balasubramanian ... G06F 21/44 726/29 |

\* cited by examiner

FIG. 9

| ADDR1 | | ADDR2 | |
|---|---|---|---|
| LA | NS | PBN | PPN |
| 0 | 0 | 2 | 4 |
| 1 | 0 | 16 | 7 |
| 2 | 1 | 28 | 2 |
| 3 | 1 | 32 | 1 |
| ⋮ | ⋮ | ⋮ | ⋮ |

# STORAGE DEVICE, HOST COMMUNICATING WITH THE STORAGE DEVICE, AND ELECTRONIC DEVICE INCLUDING THE STORAGE DEVICE

CROSS-REFERENCE TO RELATED APPLICATION

A claim of priority under 35 U.S.C. § 119 is made to Korean Patent Application No. 10-2015-0143052, filed on Oct. 13, 2015, in the Korean Intellectual Property Office, the entire contents of which are hereby incorporated by reference.

BACKGROUND

The present inventive concept herein relates to a memory device, and more particularly, to a storage device including a nonvolatile memory, a host communicating with the storage device, and an electronic device including the storage device, a card reader accessible to the storage device, a card adapter accessible to the storage device, and a method of operating the storage device.

Memory devices are used to store data and are typically categorized as either volatile memory devices or nonvolatile memory devices. A flash memory device is an example of a nonvolatile memory device, and is commonly used in portable phones, digital cameras, personal digital assistants (PDAs), mobile computer devices, fixed computer devices, and other electronic devices. As the availability and widespread use of electronic devices have grown, the amount of information processed by such electronic devices has consequently increased. Information obtained through processing by such electronic devices is typically stored in nonvolatile memory devices. As the amount of processed data has increased, the need to securely store data in nonvolatile memory devices has become an increasing necessity.

SUMMARY

Embodiments of the inventive concept provide a storage device including a connector including a plurality of connection terminals connectable to an external device, one of the plurality of connection terminals corresponding to a secure signal terminal configured to receive a secure signal that indicates a secure mode or a non-secure mode; and a nonvolatile memory including a secure area, which is accessible when the secure signal indicates the secure mode, and a normal area that is accessible when the secure signal indicates the non-secure mode. The secure area is not accessible when the secure signal indicates the non-secure mode.

Embodiments of the inventive concept also provide a host communicating with a storage device, the host including a processor configured to be driven by either of a secure operating system (OS) and a normal OS according to a secure signal; and a storage controller configured to supply the secure signal to the storage device through a secure signal terminal to control operation of the storage device in either of a secure mode or a non-secure mode. The storage controller includes the secure signal terminal.

Embodiments of the inventive concept further provide an electronic device including a system-on-a-chip (SoC) including a storage controller configured to supply a secure signal through a first secure signal terminal; and a storage device configured to operate in either of a secure mode and a non-secure mode in response to the secure signal. The storage device includes a connector including a plurality of connection terminals connected to the SoC, the plurality of connection terminals including a second secure signal terminal configured to receive the secure signal; and a nonvolatile memory including a secure area which is accessible when the secure signal indicates the secure mode, and a normal area that is accessible when the secure signal indicates the non-secure mode. The secure area is not accessible when the secure signal indicates the non-secure mode.

Embodiments of the inventive concept still further provide a card reader including a first connector including a plurality of first connection terminals connectable to a host, one of the plurality of first connection terminals corresponding to a first secure signal terminal configured to receive from the host a secure signal indicating either of a secure mode and a non-secure mode; and a second connector including a plurality of second connection terminals connectable to a storage device, one of the plurality of second connection terminals corresponding to a second secure signal terminal for transferring the secure signal to the storage device.

Embodiments of the inventive concept further provide a card adapter including a first connector including a plurality of first connection terminals connectable to a card reader, one of the plurality of first connection terminals corresponding to a first secure signal terminal configured to receive from the card reader a secure signal indicating either of a secure mode and a non-secure mode; and a second connector including a plurality of second connection terminals connectable to a storage device, the plurality of second connection terminals including a second secure signal terminal configured to transfer the secure signal to the storage device.

Embodiments of the inventive concept still further provide a method of operating a storage device including a nonvolatile memory that includes a secure area and a non-secure area. The method includes receiving a secure signal through a secure signal terminal that is one of a plurality of connection terminals connectable to an external device, the secure signal indicating either of a secure mode and a non-secure mode; and controlling access to the nonvolatile memory in response to the secure signal so that when the secure signal indicates the secure mode access to the secure area is enabled, and when the secure signal indicates the non-secure mode access to the normal area is enabled and access to the secure area is not enabled.

BRIEF DESCRIPTION OF THE FIGURES

Exemplary embodiments of the inventive concept will be more clearly understood from the following detailed description taken in conjunction with the accompanying drawings in which:

FIG. 9 is a table showing an example of an address mapping table according to an embodiment of the inventive concept;

DETAILED DESCRIPTION OF EMBODIMENTS

Figure 1:
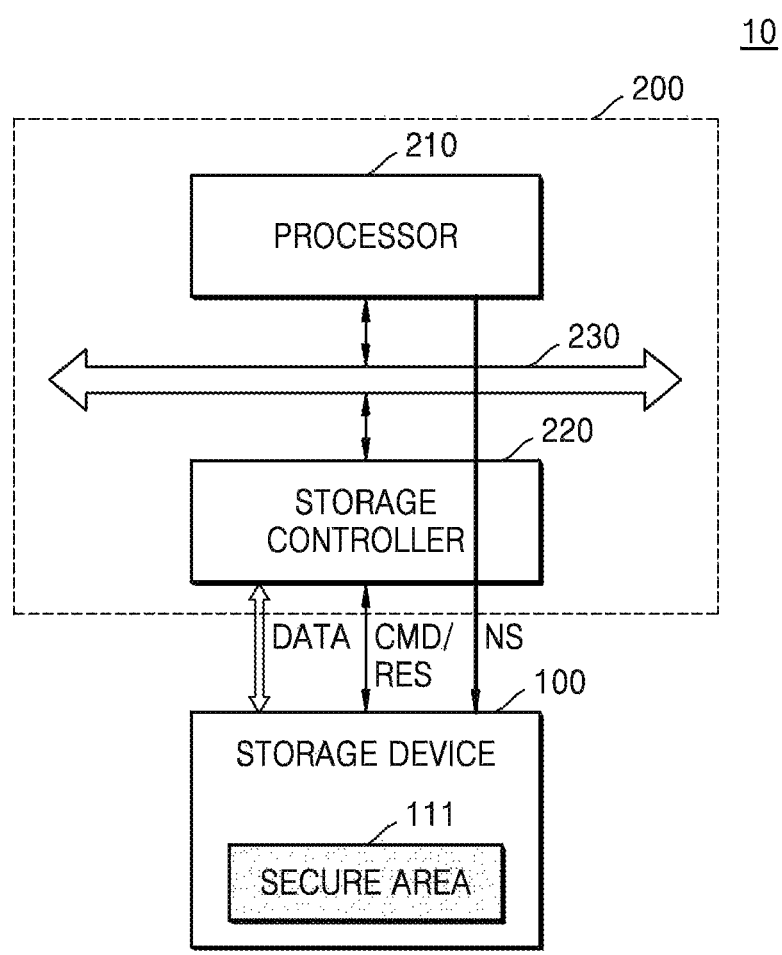
FIG. 1 is a block diagram illustrating an electronic device according to an embodiment of the inventive concept.

Hereinafter, example embodiments of the inventive concept will be described in detail with reference to the accompanying drawings. Embodiments of the inventive concept are provided so that this disclosure will be thorough and complete, and will fully convey the concept of the inventive concept to one of ordinary skill in the art. Since the inventive concept may have diverse modified embodiments, various embodiments are illustrated in the drawings and are described in the detailed description of the inventive concept. However, this should not limit the inventive concept within specific embodiments and it should be understood that the inventive concept covers all the modifications, equivalents, and replacements within the idea and technical scope of the inventive concept. Like reference numerals refer to like elements throughout. In the drawings, the dimensions and size of each structure may be exaggerated, reduced, or schematically illustrated for convenience in description and clarity.

As used herein, the term "and/or" includes any and all combinations of one or more of the associated listed items. Expressions such as "at least one" or when preceding a list of elements, modify the entire list of elements and do not modify the individual elements of the list.

The terms as used in this application describe certain embodiments, and should not limit the present embodiments. Terms of a singular form may include plural forms unless specifically referred to in the contrary. The meaning of "include," "comprise," "including," or "comprising," may specify a property, a region, a fixed number, a step, a process, an element and/or a component, but should not exclude other properties, regions, fixed numbers, steps, processes, elements and/or components.

Terms such as a first and a second may be used to describe various elements, but the elements should not be limited by these terms. The terms may be used only as object for distinguishing an element from another element. For example, without departing from the spirit and scope of the inventive concept, a first element may be referred to as a second element, and similarly, the second element may be referred to as the first element.

Unless otherwise defined, all terms (including technical and scientific terms) used herein have the same meaning as commonly understood by one of ordinary skill in the art to which this inventive concept belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

As is traditional in the field of the inventive concept, embodiments may be described and illustrated in terms of blocks which carry out a described function or functions. These blocks, which may be referred to herein as units or modules or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and/or software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the inventive concept. Likewise, the blocks of the embodiments may be physically combined into more complex blocks without departing from the scope of the inventive concept.

FIG. 1 is a block diagram illustrating an electronic device 10 according to an embodiment of the inventive concept.

Referring to FIG. 1, the electronic device 10 includes a storage device 100 and a host 200. The storage device 100 includes a secure area 111. The electronic device 10 may be implemented as for use with, or as part of, for example, a personal computer (PC), a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device or a portable navigation device (PND), an MP3 player, a handheld game console, an e-book, or the like. Also, the electronic device 10 may be, for example, one of various types of devices such as wristwatches, wearable devices such as head-mounted displays (HMDs), or the like.

The host 200 includes a processor 210, a storage controller 220, and a bus 230. The host 200 may control a data processing operation (for example, a data read operation or a data write operation) of the storage device 100. In an embodiment, the host 200 may be implemented with a system-on-a-chip (SoC), and thus may be embedded into the electronic device 10. The host 200 may be implemented with a SoC that includes a plurality of intellectual properties, for example, a clock generator, a modem, a memory, a display controller, and/or the like.

The processor 210 may be driven by a secure operating system (OS) or a normal OS according to a secure signal. For example, the processor 210 may support a TrustZone®. Here, the TrustZone® may be hardware-based security enhancement technology developed by Advanced RISC Machines (ARM). The TrustZone® will be described in detail with reference to FIG. 2.

Figure 2:
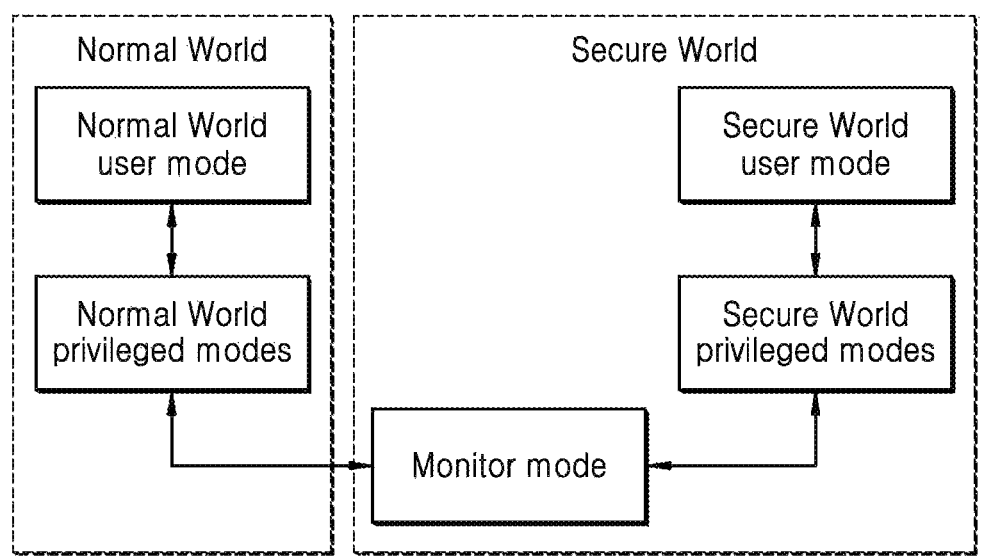
FIG. 2 is a conceptual diagram illustrating a processor according to an embodiment of the inventive concept.

FIG. 2 is a conceptual diagram illustrating the processor 210 according to an embodiment of the inventive concept.

Referring to FIG. 2, according to a TrustZone® security method, the processor 210 may be time-divisionally divided into two or more virtual cores, namely, a first virtual core and a second virtual core. The first virtual core may be executed in a normal world, and the second virtual core may be executed in a secure world. Here, the normal world may be a system environment that includes all non-secure devices and software, and the secure world may be a system environment that includes all secure devices and software. Conversion between the normal world and the secure world may be controlled through a monitor mode.

For example, games or videos may operate by using a number of resources in the normal world. Also, for example, secure applications such as mobile banking may use only a limited resource in the secure world, but may secure an environment that enables an operation to be stably performed. As described above, since the normal world and the secure world are implemented with one physical processor 210, the implementation cost of hardware is relatively low.

Figure 3:
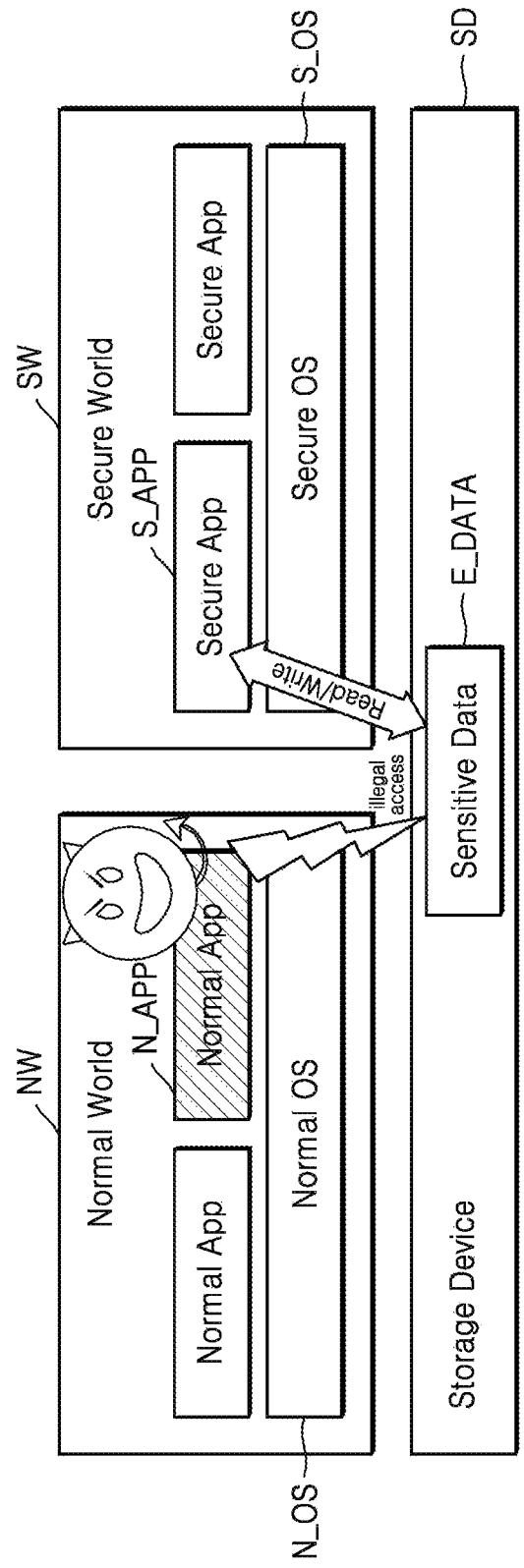
FIG. 3 illustrates an attack of a malicious program against a storage device.

FIG. 3 illustrates an attack of a malicious program against a storage device SD.

Referring to FIG. 3, a normal world NW may be a system environment driven by a normal OS N_OS, and normal applications N_APP may operate in the normal world NW. The secure world SW may be a system environment driven by a secure OS S_OS, and secure applications S_APP may operate in the secure world SW. Sensitive data applied to and used in the secure world SW may be encrypted and stored in the storage device SD, and the secure applications S_APP may access encrypted data E_DATA stored in the storage device SD. As described above, the encrypted data E_DATA may be implemented to be decrypted and used in only the secure world SW.

However, when the normal world NW and the secure world SW share the storage device SD, software (for example, the normal application N_APP or the normal OS N_OS) of the normal world NW may illegally access the encrypted data E_DATA stored in the storage device SD. In this case, the normal applications N_APP may be malicious programs (malwares). Therefore, the normal applications N_APP may continuously transmit the encrypted data E_DATA to a remote server, and the remote server may decrypt the encrypted data E_DATA to extract sensitive data. Alternatively, the normal applications N_APP may modulate the encrypted data E_DATA through fault injection.

Referring again to FIG. 1, the processor 210 may be driven by the secure OS according to a secure signal to operate in a secure mode, or may be driven by the normal OS to operate in a non-secure mode. In this embodiment of the inventive concept as here described with respect to FIG. 1, the secure signal may be a non-secure bit signal NS. Here, the non-secure bit signal NS (which hereinafter may also be referred to in the alternative generally as the secure signal NS) may be a control signal that is transferred from processor 210 to other blocks, such as the storage controller 220, of the host 200 through the bus 230.

In detail, the non-secure bit signal NS may be a control signal for a read channel and a write channel in the bus 230 and may be expressed as AxPORT[1]. When the non-secure bit signal NS has a first logic level, the non-secure bit signal NS may indicate the secure mode or a trust mode. When the non-secure bit signal NS has a second logic level, the non-secure bit signal NS may indicate the non-secure mode or a normal mode.

The non-secure bit signal NS may include a bit AWPORT[1] indicating a write transaction and a bit ARPORT[1] indicating a read transaction. When the AWPORT[1] is a low level, the AWPORT[1] may indicate a write transaction corresponding to the secure mode, and when the AWPORT[1] is a high level, the AWPORT[1] may indicate a write transaction corresponding to the non-secure mode. When the ARPORT[1] is a low level, the ARPORT[1] may indicate a read transaction corresponding to the secure mode, and when the ARPORT[1] is a high level, the ARPORT[1] may indicate a write transaction corresponding to the non-secure mode.

For example, a bus master may set the non-secure bit signal NS when constructing a new transaction. Hereinafter, a case where the secure signal is the non-secure bit signal NS will be described. However, the secure signal is not limited to the non-secure bit signal NS, and the secure signal may be an arbitrary signal indicating the secure mode or the non-secure mode.

The storage controller 220 may be a block for interfacing the storage device 100. The storage controller 220 may issue a command CMD to the storage device 100, receive a response RES to the command CMD, transmit data which is to be stored in the storage device 100, and receive data read from the storage device 100. The storage controller 220 may be referred to as a host controller, a static memory controller (SMC), or a flash memory controller (FMC).

In the present embodiment, the storage controller 220 may supply the non-secure bit signal NS to the storage device 100, thereby controlling the storage device 100 to operate in the secure mode or the non-secure mode. Therefore, the secure mode or the non-secure mode executed by the host 200 may be expanded to the storage device 100, and the storage controller 220 may further reinforce hardware-based security in a storage level. The storage controller 220 may include a secure signal terminal for providing the secure signal. The storage controller 220 will be described in detail with reference to FIG. 4.

The bus 230 may transfer the secure signal between the processor 210 and the storage controller 220. In the present embodiment, the storage controller 220 may be directly connected to the bus 230. For example, the bus 230 may be an advanced extensible interface (AXI) bus. The AXI bus may be a system bus interface. The AXI may separate the read channel and the write channel and may provide a multiple outstanding address function and a data interleaving function.

In the bus 230, examples of technology for connecting Internet protocols (IPs) included in an SoC may include a connection method based on a system bus. For example, a bus standard may use advanced microcontroller bus architecture (AMBA) protocol of Advanced RISC Machine (ARM). A bus type of the AMBA protocol may include for example advanced high-performance bus (AHB), advanced peripheral bus (APB), AXI, AX14, AXI coherency extensions (ACE), and/or the like. In addition, other types of protocols such as for example nNetwork of SONICs Inc., CoreConnect of IBM, open core protocol of OCP-IP, and/or the like may be applied to the system bus.

The storage device 100 may receive the secure signal and the command CMD from the storage device 100, supply the response RES to the command CMD to the storage controller 220, and transmit or receive data DATA to or from the storage controller 220. The storage device 100 may be electrically connected to the host 200 through, for example, connection units such as pins, pads, or communication lines, for performing data communication with the host 200.

The storage device 100 includes the secure area 111, which may be visualized in response to the secure signal and therefore accessed. In detail, when the secure signal indicates the secure mode, the secure area 111 may be visualized (i.e., visible to the host 200 or external device) and therefore accessed, and when the secure signal indicates the non-secure mode, the secure area 111 may not be visualized (i.e., not visible to the host 200 or external device) and therefore may not be accessed. In the present embodiment, the storage device 100 may include a secure signal terminal for receiving the secure signal. The storage device 100 will be described in detail with reference to FIG. 5.

In some embodiments, the storage device 100 may be an internal memory embedded into the electronic device 10. For example, the storage device 100 may be a universal flash storage (UFS), an embedded multi-media card (eMMC), or a solid state drive (SSD). However, the present embodiment is not limited thereto. In other embodiments, the storage device 100 may be a non-volatile memory (for example, one time programmable read-only memory (OTPROM), a programmable read-only memory (PROM), an erasable and programmable read-only memory (EPROM), an electrically erasable and programmable read-only memory (EEPROM), a mask read-only memory (ROM), or a flash ROM, or the like).

In some embodiments, the storage device 100 may be an external memory detachable/attachable from/to the electronic device 10. For example, the storage device 100 may be an external memory that includes at least one of a compact flash (CF), a secure digital (SD), a micro-SD, a mini-SD, an extreme digital (xD), and a memory stick, or the like.

Figure 4:
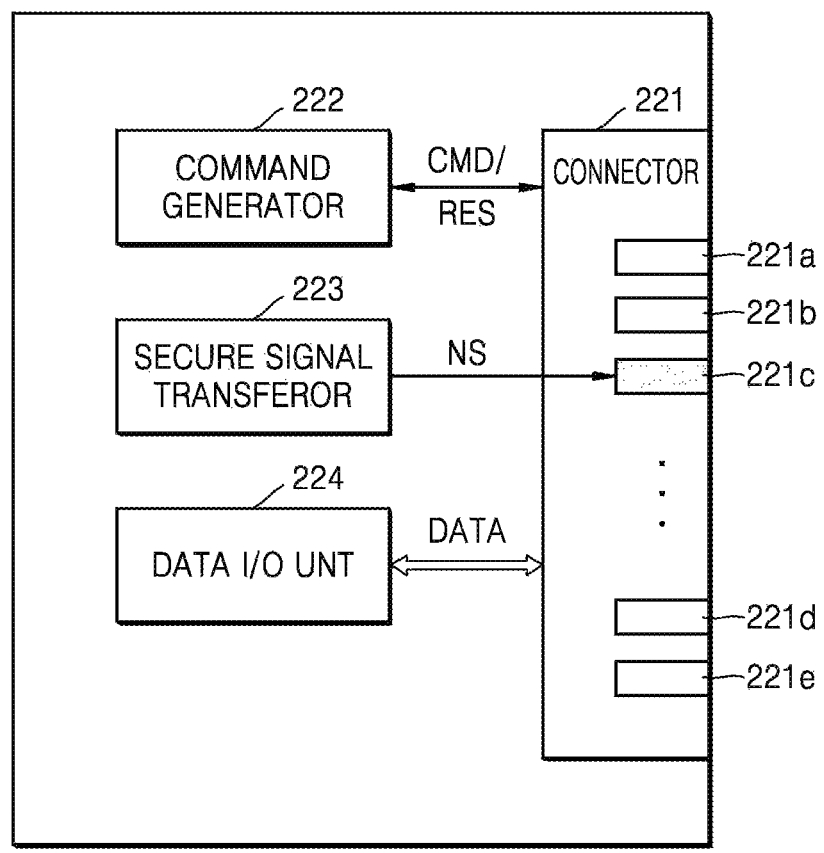
FIG. 4 is a block diagram illustrating a storage controller according to an embodiment of the inventive concept.

FIG. 4 is a block diagram illustrating the storage controller 220 according to an embodiment of the inventive concept.

Referring to FIG. 4, the storage controller 220 includes a connector 221, a command generator 222, a secure signal transferor 223, and a data input/output (I/O) unit 224. The elements included in the storage controller 220 may be implemented by hardware, software, or a combination of hardware and software. For example, all or some of the elements included in the storage controller 220 may be implemented with firmware. Hereinafter, a configuration and operation of the storage controller 220 will be described with reference to FIGS. 1 and 4.

The connector 221 may include a plurality of connection terminals 221a to 221e connectable to the storage device 100, and may be referred to as a port. The number of the connection terminals 221a to 221e may be changed according to an embodiment or particular application. For example, the plurality of connection terminals 221a to 221e may be implemented with pins, pads, or communication lines. Hereinafter, an embodiment where the plurality of connection terminals 221a to 221e is implemented with pins will be described.

The number, size, and arrangement of the connection pins 221a to 221e may be changed according to an embodiment or particular application, and in detail, may be determined based on an interface protocol communicating with the storage device 100. For example, the storage device 100 and the host 200 may communicate with each other through at least one of various interface protocols such as advanced technology attachment (ATA), serial-ATA (SATA), external SATA (e-SATA), parallel-ATA (PATA), small computer system interface (SCSI), serial attached SCSI (SAS), peripheral component interconnection (PCI), PCI express (PCIe), IEEE 1394, universal serial bus (USB), enhanced small disk interface (ESDI), integrated drive electronics (IDE), secure digital (SD) card, multimedia card (MMC), embedded multi-media card (eMMC), universal flash storage (UFS), and compact flash (CF) card interface or the like.

In some embodiments, one of the plurality of connection pins may be a secure signal terminal (i.e., a secure signal pin 221c) through which a secure signal NS is supplied to the storage device 100. The secure signal pin 221c may be a dedicated pin through which the secure signal NS is transferred. However, the present embodiment is not limited thereto. In some embodiments, the secure signal NS may be transferred through two or more of the plurality of connection pins. For example, the secure signal NS including bits AWPORT[1] and the ARPORT[1] may be respectively transferred through two of the plurality of connection pins. In an embodiment, the secure signal pin 221c may be a reserved pin in the standard specification. In an embodiment, the secure signal pin 221c may be a new or added pin.

The command generator 222 may generate a command CMD responsive to a request to perform a task and transmit the command CMD to the storage device 100, and may receive a response RES to the command CMD. The data I/O unit 224 may transmit data DATA which is to be written in the storage device 100 to the storage device 100, and may receive data DATA read from the storage device 100.

The secure signal transferor 223 may transfer the secure signal NS, which is set based on an operation mode of the host 200, to the storage device 100. In detail, when the operation mode of the host 200 is the secure mode, the secure signal transferor 223 may transfer the secure signal NS indicating the secure mode to the storage device 100, and thus, the secure mode may be expanded in the storage device 100. Also, when the operation mode of the host 200 is the non-secure mode, the secure signal transferor 223 may transfer the secure signal NS indicating the non-secure mode to the storage device 100, and thus, the non-secure mode may be expanded in the storage device 100 so that secure area 111 may not be accessed.

As described above, according to an embodiment, the storage controller 220 may include the secure signal pin 221c and may transmit the secure signal NS to the storage device 100 through the secure signal pin 221c. Therefore, software of the normal world is prevented from accessing sensitive data of the secure world stored in the storage device 100, and thus, the storage device 100 enhances security for the electronic device 10.

Moreover, according to the present embodiment, an architecture of the host 200 may be applied as-is, without the need to add a separate storage device for providing a secure area. Furthermore, the host 200 will not need to perform separate management for setting of such a separate storage device. Therefore, the secure area 111 of the storage device 100 which is available in only the secure world of the host 200 may be provided at no additional charge.

Figure 5:
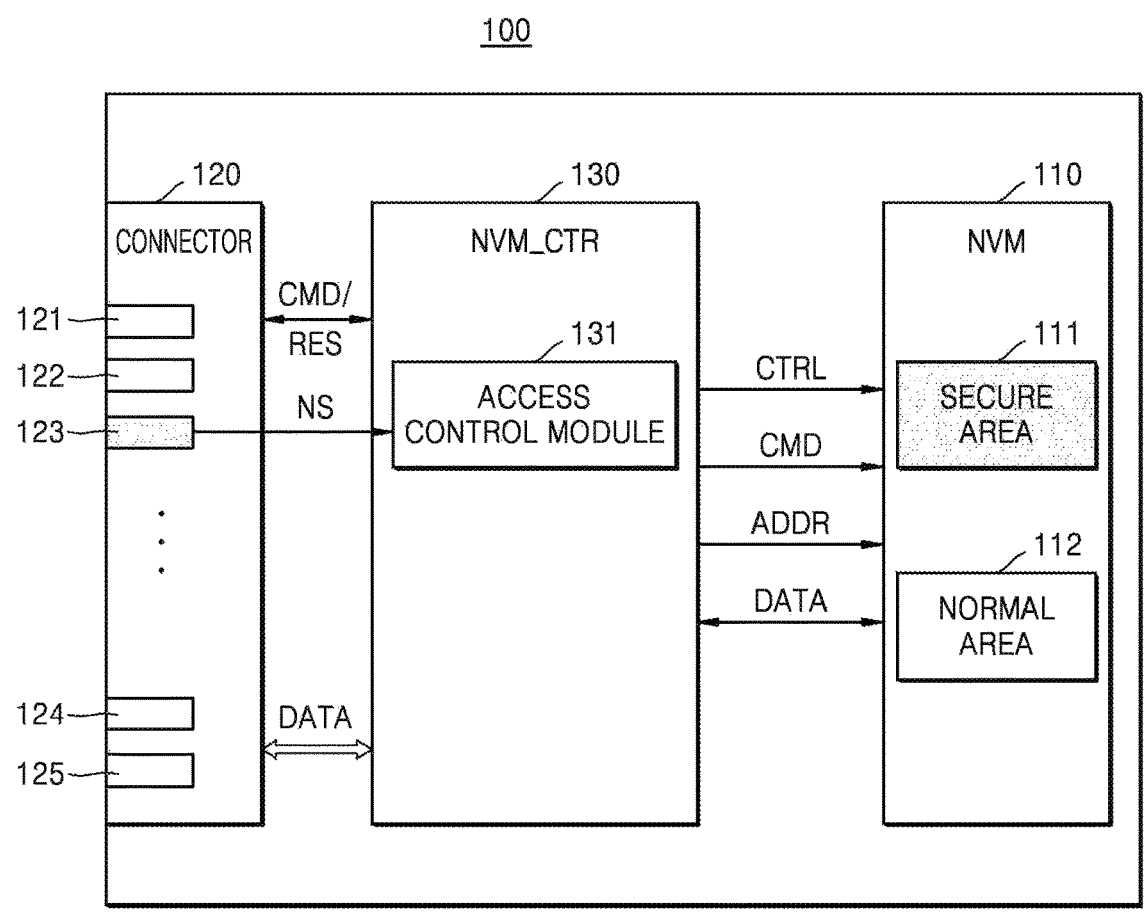
FIG. 5 is a block diagram illustrating a storage device according to an embodiment of the inventive concept.

FIG. 5 is a block diagram illustrating a storage device 100 according to an embodiment of the inventive concept.

Referring to FIG. 5, the storage device 100 includes a nonvolatile memory (NVM) 110, a connector 120, and a nonvolatile memory controller (NVM_CTR) 130. The nonvolatile memory 110 includes a secure area 111 and a normal area 112, and the nonvolatile memory controller 130 includes an access control module 131. Hereinafter, a configuration and operation of the storage device 100 will be described with reference to FIG. 5.

The connector 120 includes a plurality of connection terminals 121 to 125 connectable to an external device such as the host 200 and/or the like. The connection terminals 121 to 125 may be referred to as a port. For example, the plurality of connection terminals 121 to 125 may be implemented with pins or pads. Hereinafter, an embodiment where the plurality of terminals 121 to 125 are implemented with pins will be described.

The number, size, and arrangement of the connection pins 121 to 125 may be changed according to an embodiment or particular application, and in detail, may be determined based on an interface protocol communicating with the storage device 100. For example, the storage device 100 and the host 200 may communicate with each other through at least one of various interface protocols such as ATA, SATA, e-SATA, PATA, SCSI, SAS, PCI, PCIe, IEEE 1394, USB, ESDI, IDE, SD card, MMC, eMMC, UFS, and CF card interface or the like.

In some embodiments, one of the plurality of connection pins may be a secure signal terminal (i.e., a secure signal pin 123) for receiving a secure signal NS from the external device (i.e., host 200). The secure signal pin 123 may be a dedicated pin through which the secure signal NS is transferred. However, the present embodiment is not limited thereto. In some embodiments, the secure signal NS may be transferred through two or more of the plurality of connection pins. For example, the secure signal NS including the bits AWPORT[1] and the ARPORT[1] may be respectively received through two of the plurality of connection pins.

Figure 6A:
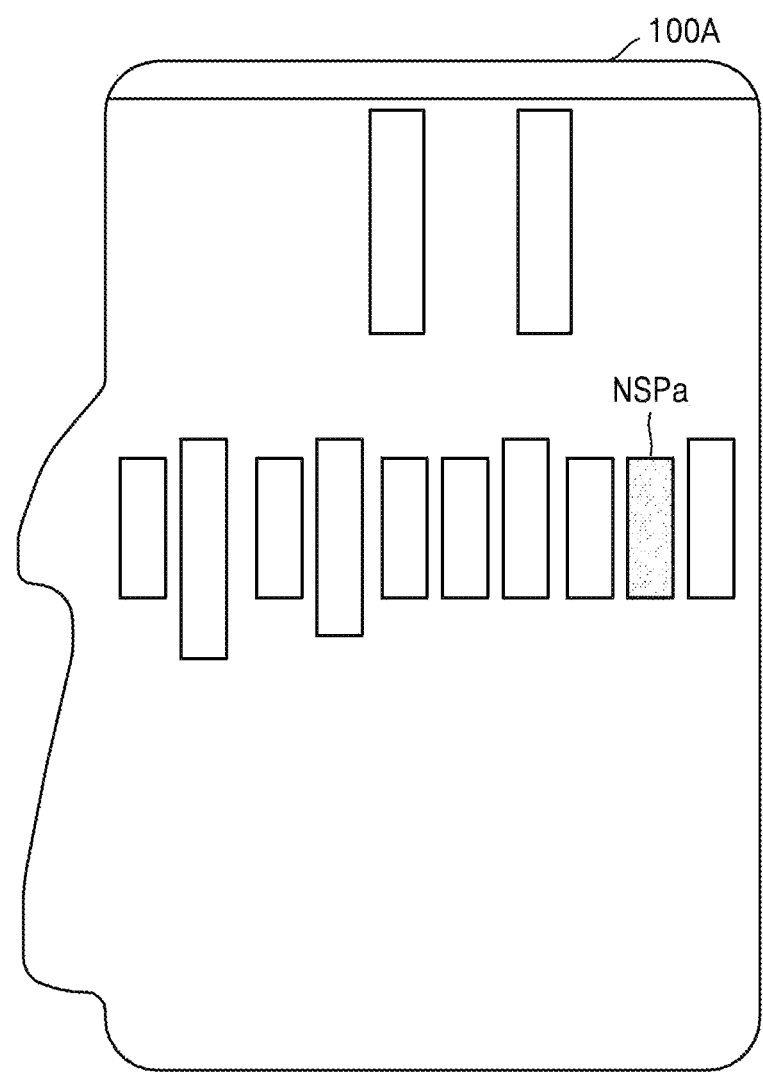
FIGS. 6A and 6B illustrate connection pins arranged on one surface of a storage device according to some embodiments of the inventive concept.
Figure 6B:
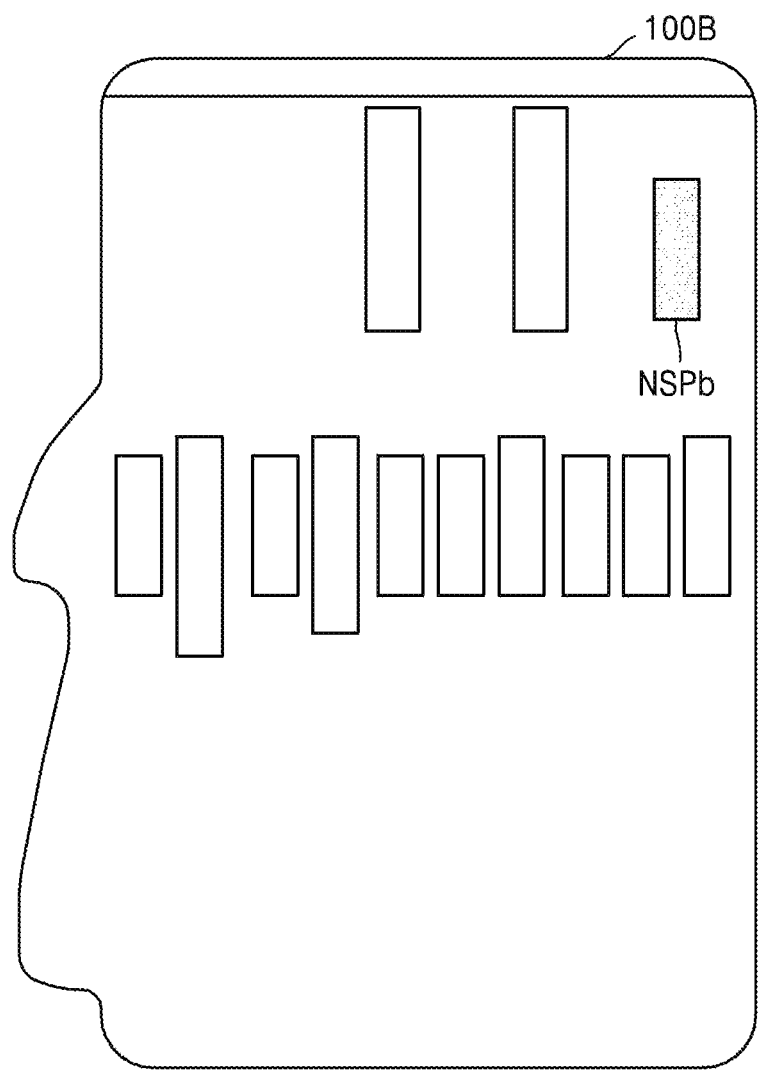

FIGS. 6A and 6B illustrate connection pins arranged on one surface of a storage device according to some embodiments of the inventive concept.

Referring to FIG. 6A, a plurality of connection pins may be arranged on one surface of a storage device 100A. One of the plurality of connection pins may be a secure signal pin NSPa, which may be a reserved pin in the standard specification. For example, the storage device 100A may be a micro-SD card, but is not limited thereto.

Referring to FIG. 6B, a plurality of connection pins may be arranged on one surface of a storage device 100B. One of the plurality of connection pins may be a secure signal pin NSPb, which may be a new pin added to the one surface of a storage device 100B. For example, the storage device 100B may be a micro-SD card, but is not limited thereto.

Referring again to FIG. 5, the nonvolatile memory 110 includes the secure area 111 and the normal area 112, and the normal area 112 may be referred to as a non-secure area. When the secure signal NS indicates the secure mode, the secure area 111 may be visualized, and thus, the host 200 may access the secure area 111. When the secure signal NS indicates the non-secure mode, the secure area 111 may not be visualized, and thus, the host 200 may access the normal area 112 but cannot access the secure area 111. The nonvolatile memory 110 may be used as two separated memory devices according to the secure signal NS, thus preventing unauthorized access to secure area 111 of nonvolatile memory 110.

The nonvolatile memory 110 may include a plurality memory cells, and for example, the plurality of memory cells may be flash memory cells. Hereinafter, a case where the plurality of memory cells are NAND flash memory cells will be described as an example of the present embodiment. However, the present embodiment is not limited thereto. In other embodiments, the plurality of memory cells may for example be resistive memory cells such as resistive random access memory (RRAM), phase change RAM (PRAM), or magnetic RAM (MRAM) or the like.

The secure area 111 may be used as a space storing sensitive data which is used in only the secure world of the host 200. When the secure signal NS indicates the secure mode, the host 200 may access the secure area 111. When the secure signal NS indicates the non-secure mode, the host 200 cannot access the secure area 111. The secure area 111 may be a portion of a whole memory capacity of the nonvolatile memory 110 and may be allocated by a user. In an embodiment, a size of the secure area 111 may be set only once at an initial stage. In an embodiment, the size of the secure area 111 may be modified a plurality of times.

The normal area 112 may be a space that stores normal user data and may be used as a space storing data which is used in the normal world. When the secure signal NS indicates the non-secure mode, the host 200 may access the normal area 112. Also, when the secure signal NS indicates the secure mode, the host 200 may access the normal area 112.

The nonvolatile memory controller 130 may control the nonvolatile memory 110 to read data stored in the nonvolatile memory 110 and to write data in the nonvolatile memory 110 in response to a read/write request from the host 200. In detail, the nonvolatile memory controller 130 may supply an address ADDR, a command CMD, and a control signal CTRL to the nonvolatile memory 110 to control a program (or write) operation, a read operation, and an erase operation of the nonvolatile memory 110. Also, data DATA for the program operation and read data DATA may be transmitted or received between the nonvolatile memory controller 130 and the nonvolatile memory 110.

The nonvolatile memory controller 130 may determine whether it is possible to access the secure area 111 according to the secure signal NS and may control the nonvolatile memory 110, based on a result of the determination. The access control module 131 may control access to the nonvolatile memory 110 in response to the secure signal NS. In detail, the access control module 131 may control the nonvolatile memory 110 so that when the secure signal NS indicates the secure mode, it is possible to access the secure area 111 and the normal area 112, and when the secure signal NS indicates the non-secure mode, it is possible to access only the normal area 112. The access control module 131 may be implemented by hardware, software, or a combination of hardware and software. For example, the access control module 131 may be implemented with firmware.

Figure 7:
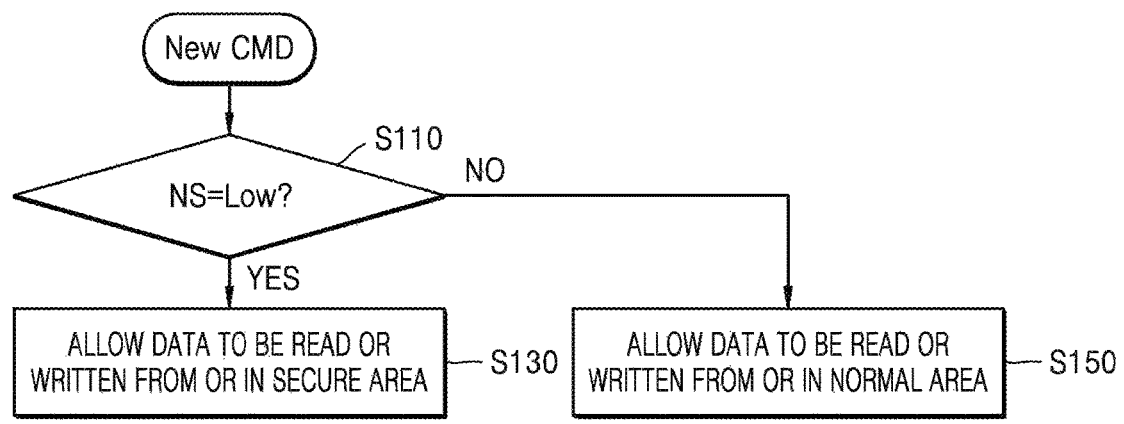
FIG. 7 is a flowchart illustrating a method of controlling access to a storage device according to an embodiment of the inventive concept.

FIG. 7 is a flowchart illustrating a method of controlling access to a storage device according to an embodiment of the inventive concept.

Referring to FIG. 7, the method of controlling access to a storage device according to an embodiment of the inventive concept may be a method which is time-serially performed in the storage device, and for example, may include operations which are time-serially performed in the storage device 100 of FIG. 5. The details described above with reference to FIGS. 1 to 6 may be applied to the present embodiment, and repetitive description is omitted.

In operation S110 shown in FIG. 7, when a new command is received from the host 200, the storage device 100 determines whether the secure signal NS indicates the secure mode. In an embodiment, the access control module 131 may determine whether the secure signal NS has a low level. When it is determined that the secure signal NS has a low level, operation S130 is performed, and when it is determined that the secure signal NS has a high level operation S150 is performed.

In operation S130, the storage device 100 allows data to be read from or written in the secure area 111. In an embodiment, the access control module 131 may allow data to be read from or written in the secure area 111 and may generate the command CMD, the address ADDR, or the control signal CTRL for accessing the secure area 111 in response to a read/write request from the host 200. In some embodiments, the access control module 131 may allow data to be read from or written in the secure area 111 and the normal area 112 in operation S130.

In operation S150, the storage device 100 allows data to be read from or written in the normal area 112. In an embodiment, the access control module 131 may allow data to be read from or written in the normal area 112 and may generate the command CMD, the address ADDR, or the control signal CTRL for accessing the normal area 112.

Figure 8:
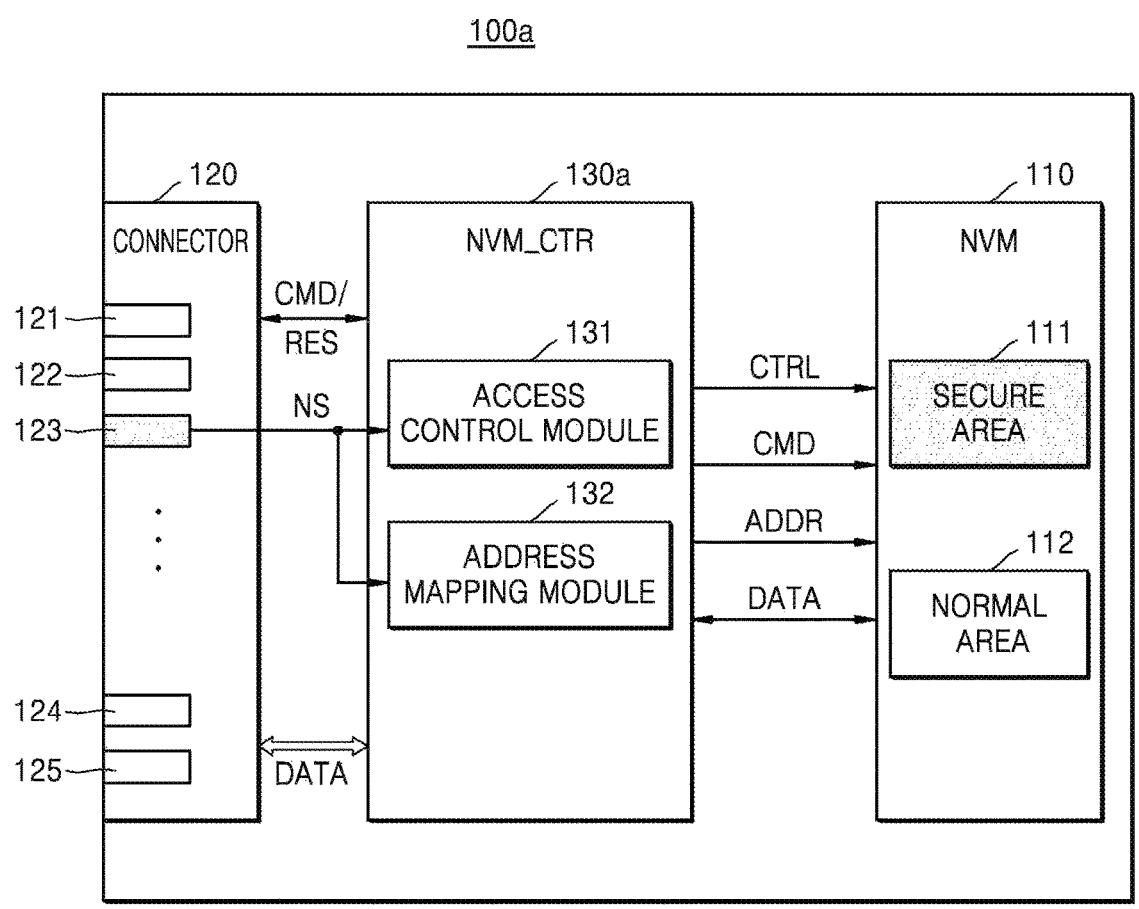
FIG. 8 is a block diagram illustrating a storage device according to an embodiment of the inventive concept.

FIG. 8 is a block diagram illustrating a storage device 100*a* according to an embodiment of the inventive concept.

Referring to FIG. 8, the storage device 100*a* includes a nonvolatile memory 110, a connector 120, and a nonvolatile memory controller 130*a*. The storage device 100*a* according to the embodiment of FIG. 8 is a modification of the storage device 100 described with respect to FIG. 5. Accordingly, the details of operation and configuration of storage device 100 in FIG. 5 that are the same may be applied to storage device 100*a* in FIG. 8 and may be omitted from the following description. Hereinafter, the following description will refer to FIGS. 1 and 8, and will focus on the manner in which details of operation and configuration of storage device 110*a* in FIG. 8 is different than the storage device 110 of FIG. 5.

The nonvolatile memory controller 130*a* in FIG. 8 includes an access control module 131 and an address mapping module 132. The access control module 131 may be implemented substantially similar to the access control module 131 of FIG. 5. The address mapping module 132 may be implemented by hardware, software, or a combination of hardware and software. For example, the address mapping module 132 may be implemented with firmware. However, the present embodiment is not limited thereto. In other embodiments, the nonvolatile memory controller 130*a* may include only the address mapping module 132.

The address mapping module 132 may map a logical address, received from the host 200, to a physical address of the nonvolatile memory 110, based on a secure signal NS. Hereinafter, a mapping operation of the address mapping module 132 will be described in detail with reference to FIG. 9.

FIG. 9 is a table showing an example of an address mapping table according to an embodiment of the inventive concept.

Referring to FIGS. 1, 8 and 9, the address mapping module 132 may generate the address mapping table shown in FIG. 9 and may store the generated address mapping table in a memory included in the nonvolatile memory controller 130*a* or in a meta area (not shown) of the nonvolatile memory 110. The address mapping module 132 may be implemented in a flash translation layer (FTL) of the nonvolatile memory controller 130*a*.

The address mapping module 132 may combine a logical address LA and the secure signal NS, which are respectively input through different pins from the host 200, to generate a first address ADDR1. An operation of generating the first address ADDR1 may be referred to as primary mapping. Here, the logical address LA may be an address which is allocated according to a logical block addressing (LBA) architecture. In an embodiment, the logical address LA may include a logical unit number (LUN). In other embodiments, the logical address LA may include a namespace, or may include a logical block number (LBN).

Moreover, the address mapping module 132 may map the first address ADDR1 to a second address ADDR2 corresponding to a physical address of the nonvolatile memory 110, and an operation of mapping the first address ADDR1 to the second address ADDR2 may be referred to as secondary mapping. In an embodiment, the second address ADDR2 may include a physical block number (PBN) or a physical page number (PPN). However, the present embodiment is not limited thereto, and the second address ADDR2 may include a column number.

In an embodiment, when the secure signal NS has a low level (i.e., logic "0"), the secure signal NS may indicate the secure mode, and when the secure signal NS has a high level (i.e., logic "1"), the secure signal NS may indicate the non-secure mode. For example, in the embodiment of FIG. 9, when the logical address LA is 0 or 1 as shown, the secure signal NS has a low level, and thus, the address mapping module 132 maps the respective logical addresses LA to second addresses ADDR2 corresponding to the secure area 111. Also as shown, when the logical address LA is 2 or 3, the secure signal NS has a high level, and thus, the address mapping module 132 maps the logical addresses LA to second addresses ADDR2 corresponding to the normal area 112.

Figure 10:
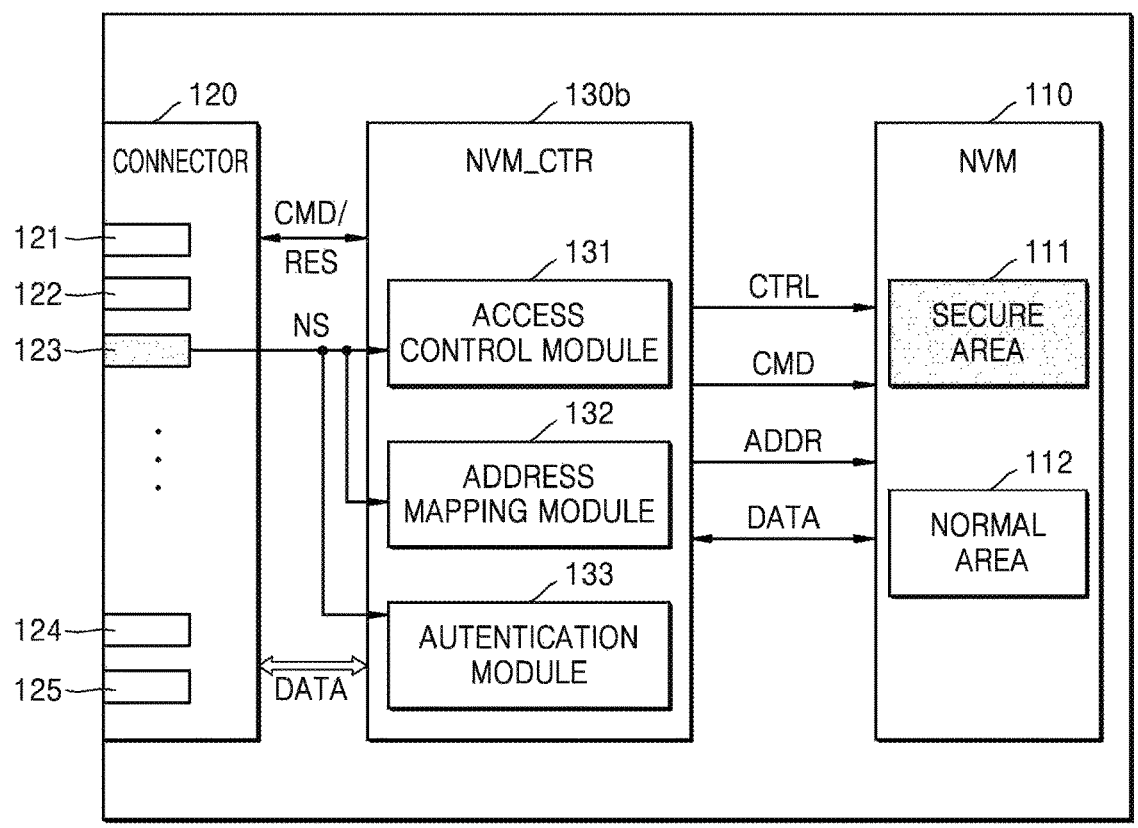
FIG. 10 is a block diagram illustrating a storage device according to an embodiment of the inventive concept.

FIG. 10 is a block diagram illustrating a storage device 100*b* according to an embodiment of the inventive concept.

Referring to FIG. 10, the storage device 100*b* includes a nonvolatile memory 110, a connector 120, and a nonvolatile memory controller 130*b*. The storage device 100*b* according to the embodiment of FIG. 10 is a modification of the storage device 100 of FIG. 5 and/or the storage device 100*a* of FIG. 8. Accordingly, the details of operation and configuration of storage device 100 in FIG. 5 or the storage device 100*a* in FIG. 8 that are the same may be applied to storage device 100*b* in FIG. 10 and may be omitted from the following description. Hereinafter, the following description will refer to FIGS. 1 and 10, and will focus on the manner in which details of operation and configuration of storage device 110*b* in FIG. 10 is different than the storage device 110 and 110*a* of respective FIGS. 5 and 8.

The nonvolatile memory controller 130*b* in FIG. 10 includes an access control module 131, an address mapping module 132, and an authentication module 133. The access control module 131 may be implemented substantially similar to the access control module 131 of FIG. 5, and the address mapping module 132 may be implemented substantially similar to the address mapping module 132 of FIG. 8. The authentication module 133 may be implemented by hardware, software, or a combination of hardware and software. For example, the authentication module 133 may be implemented with firmware. However, the present embodiment is not limited thereto. In other embodiments, the nonvolatile memory controller 130b may include only the authentication module 133. In other embodiments, the nonvolatile memory controller 130b may include only the address mapping module 132 and the authentication module 133.

The authentication module 133 may perform an authentication operation on the host 200 according to the secure signal NS, and may supply an authentication result to the access control module 131. Here, the authentication operation may correspond to a method of identifying or verifying, by the storage device 100b, an external device (i.e., the host 200) accessing the storage device 100b. For example, the authentication module 133 may perform the authentication operation by using a digital signature or a password sent to authentication module 133 by the external device. For example, when the storage device 100b is an external card type, security for the secure area 111 is further reinforced by using the authentication module 133.

In detail, when the secure signal NS indicates the secure mode, the authentication module 133 may perform the authentication operation on the host 200, and when the secure signal NS indicates the non-secure mode, the authentication module 133 may not perform the authentication operation on the host 200. In an embodiment, when the secure signal NS indicates the secure mode, the authentication module 133 may authenticate the secure mode of the host 200 and may determine whether it is possible to access the secure area 111, based on a result of the authentication. Hereinafter, an authentication operation of the authentication module 133 will be described in detail with reference to FIG. 11.

Figure 11:
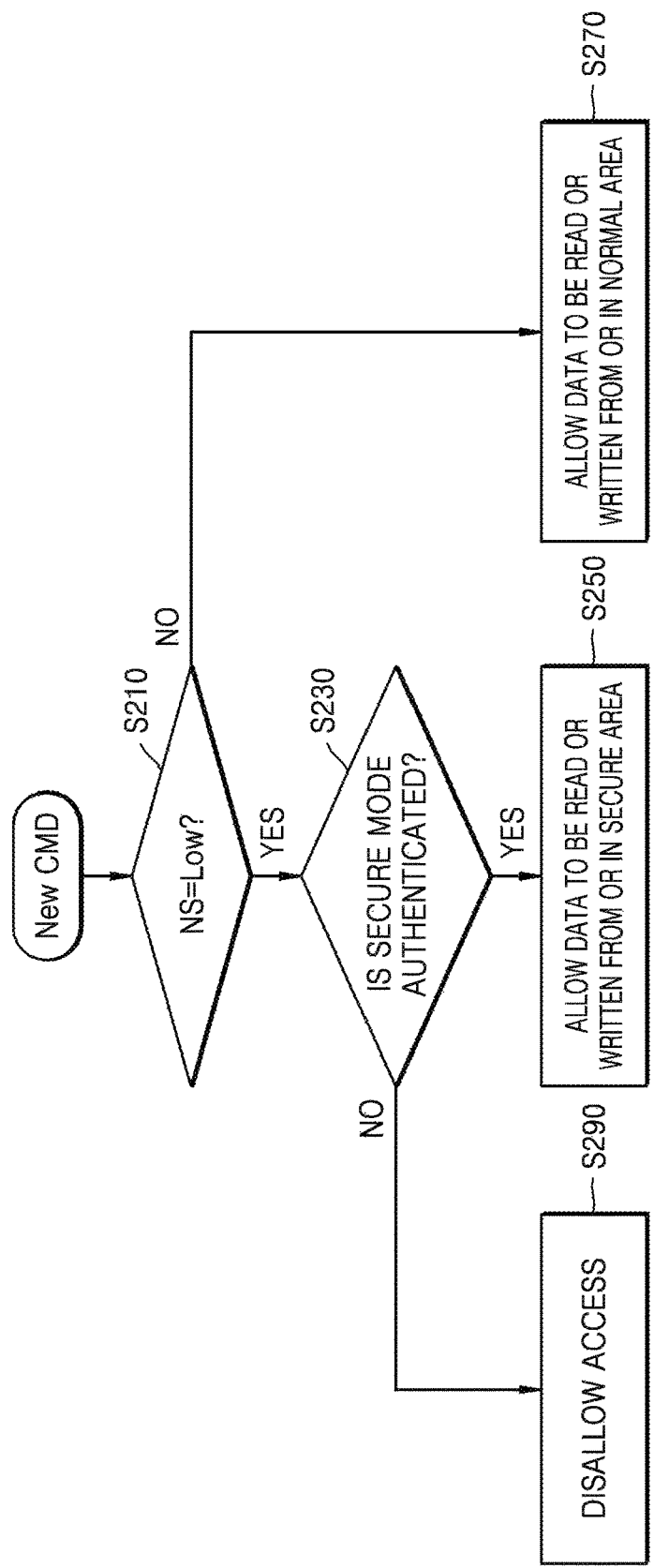
FIG. 11 is a flowchart illustrating a method of controlling access to a storage device according to an embodiment of the inventive concept.

FIG. 11 is a flowchart illustrating a method of controlling access to a storage device according to an embodiment of the inventive concept.

Referring to FIG. 11, the method of controlling access to a storage device according to an embodiment may be a method which is time-serially performed in the storage device, and for example, may include operations which are time-serially performed in the storage device 100b of FIG. 10. The details described above with reference to FIGS. 1 to 10 may be applied to the present embodiment, and repetitive description may be omitted.

In operation S210, when a new command is received from the host 200, the storage device 100b may determine whether the secure signal NS indicates the secure mode. In an embodiment, the access control module 131 may determine whether the secure signal NS has a low level indicative of the secure mode. When the secure signal NS has a low level as a result of the determination, operation S230 may be performed, and when the secure signal NS has a high level indicative of the non-secure mode, operation S270 may be performed.

In operation S230, the storage device 100b may determine whether to authenticate the secure mode. In an embodiment, the authentication module 133 may authenticate the secure mode of the host 200 and may supply an authentication result to the access control module 131. For example, the authentication module 133 may authenticate the secure mode of the host 200 by using a password or a digital signature provided by host 200. When the secure mode is authenticated as a result of the determination, operation S250 may be performed, and when the secure mode is not authenticated, operation S290 may be performed.

In operation S250, the storage device 100b may allow data to be read from or written in the secure area 111. In an embodiment, the access control module 131 may allow data to be read from or written in the secure area 111 and may generate the command CMD, the address ADDR, or the control signal CTRL for accessing the secure area 111. In some embodiments, the access control module 131 may allow data to be read from or written in the secure area 111 and the normal area 112 when the secure mode is authenticated.

In operation S270, the storage device 100b may allow data to be read from or written in the normal area 112. In an embodiment, the access control module 131 may allow data to be read from or written in the normal area 112 and may generate the command CMD, the address ADDR, or the control signal CTRL for accessing the normal area 112.

In operation S290, the storage device 100b may disallow access to the host 200. According to the present embodiment, when the secure signal NS indicates the secure mode, an operation of authentication of the secure mode may be further performed, thereby reinforcing security for the secure area 111. For example, even in a case where the secure signal NS is maliciously manipulated, when the secure mode of the host is not an authenticated secure mode, access to the storage device 100b may be disallowed.

Figure 12:
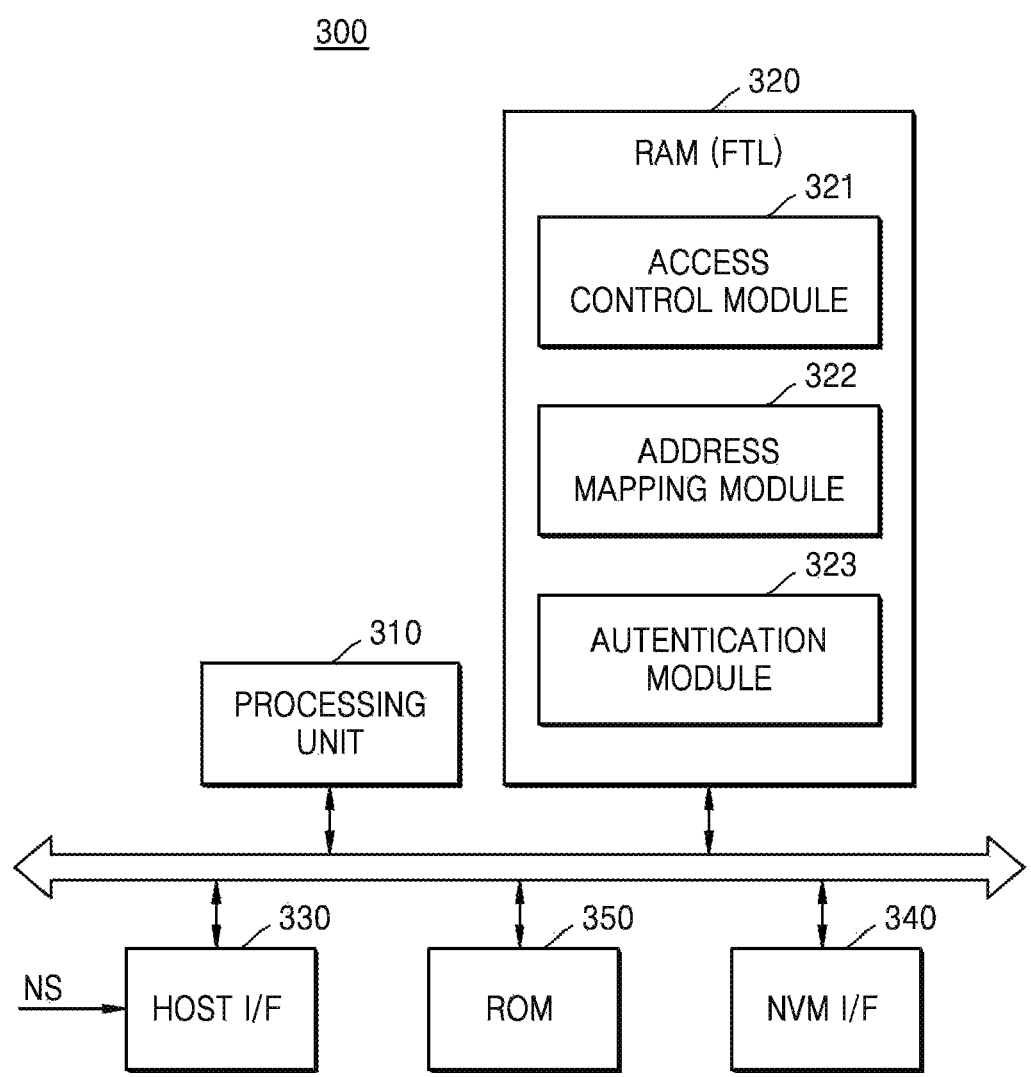
FIG. 12 is a block diagram illustrating a nonvolatile memory controller according to an embodiment of the inventive concept.

FIG. 12 is a block diagram illustrating a nonvolatile memory controller 300 according to an embodiment of the inventive concept.

Referring to FIG. 12, the nonvolatile memory controller 300 includes a processing unit 310, a random access memory (RAM) 320, a host interface 330, a nonvolatile memory interface 340, and a read-only memory (ROM) 350.

The processing unit 310 may include a central processing unit (CPU) or a microprocessor, and may control an overall operation of the memory controller 300. The processing unit 310 may drive firmware loaded into the RAM 320, for controlling the nonvolatile memory controller 300. That is, the firmware may be loaded into the RAM 320 and driven.

The RAM 320 may operate according to control by the processing unit 310 and may be used as a work memory, a buffer memory, a cache memory, or the like. When the RAM 320 is used as the work memory, data obtained through processing by the processing unit 310 may be temporarily stored in the RAM 320. When the RAM 320 is used as the buffer memory, the RAM 320 may be used to buffer data which is to be transmitted from a host (for example, 200 of FIG. 1) to a nonvolatile memory (for example, 110 of FIG. 5) or to buffer data which is to be transmitted from the nonvolatile memory to the host. When the RAM 320 is used as the cache memory, the RAM 320 enables a low-speed nonvolatile memory to operate at a high speed.

Software (or firmware) and data for controlling the nonvolatile memory controller 300 may be loaded into the RAM 320. The loaded software and data may be processed by the processing unit 310. A FTL may be loaded into the RAM 320. The FTL may perform for example an address mapping operation of mapping a logical address to a physical address of a nonvolatile memory, a garbage collection operation of adjusting a location of a valid page and deleting a block for removing an invalid page which is generated in an operation of updating data, and/or a wear levelling operation for equally maintaining the wear levels of blocks so that some blocks are not worn prior to the other blocks because wear is accumulated.

According to the present embodiment, an access control module 321, an address mapping module 322, and an authentication module 323 may be loaded into the RAM 320. Also, an address mapping table generated by the address mapping module 322 may be stored in the RAM 320. The access control module 321, the address mapping module 322, and the authentication module 323 may respectively correspond to, for example, the access control module 131, address mapping module 132, and authentication module 133 of FIG. 10.

The host interface 330 may provide an interface between the host and the nonvolatile memory controller 300. The host and the nonvolatile memory controller 300 may communicate with each other through at least one of various standard interfaces. For example, the standard interfaces may each include at least one of various interfaces such as ATA, SATA, e-SATA, PATA, SCSI, SAS, PCI, PCIe, IEEE 1394, USB, ESDI, IDE, SD card, MMC, eMMC, UFS, and CF card interface.

The nonvolatile memory interface 340 may provide an interface between the nonvolatile memory controller 300 and the nonvolatile memory (such as non-volatile memory 110 shown in FIG. 5 for example). For example, written data and read data may be transmitted or received to or from the nonvolatile memory through the memory interface 340. Also, the memory interface 340 may supply a command and an address to the nonvolatile memory and may receive various pieces of information from the nonvolatile memory to supply the received information to the nonvolatile memory controller 300. The ROM 350 may store code data necessary for initial booting of a device to which a memory system is applied.

Figure 13:
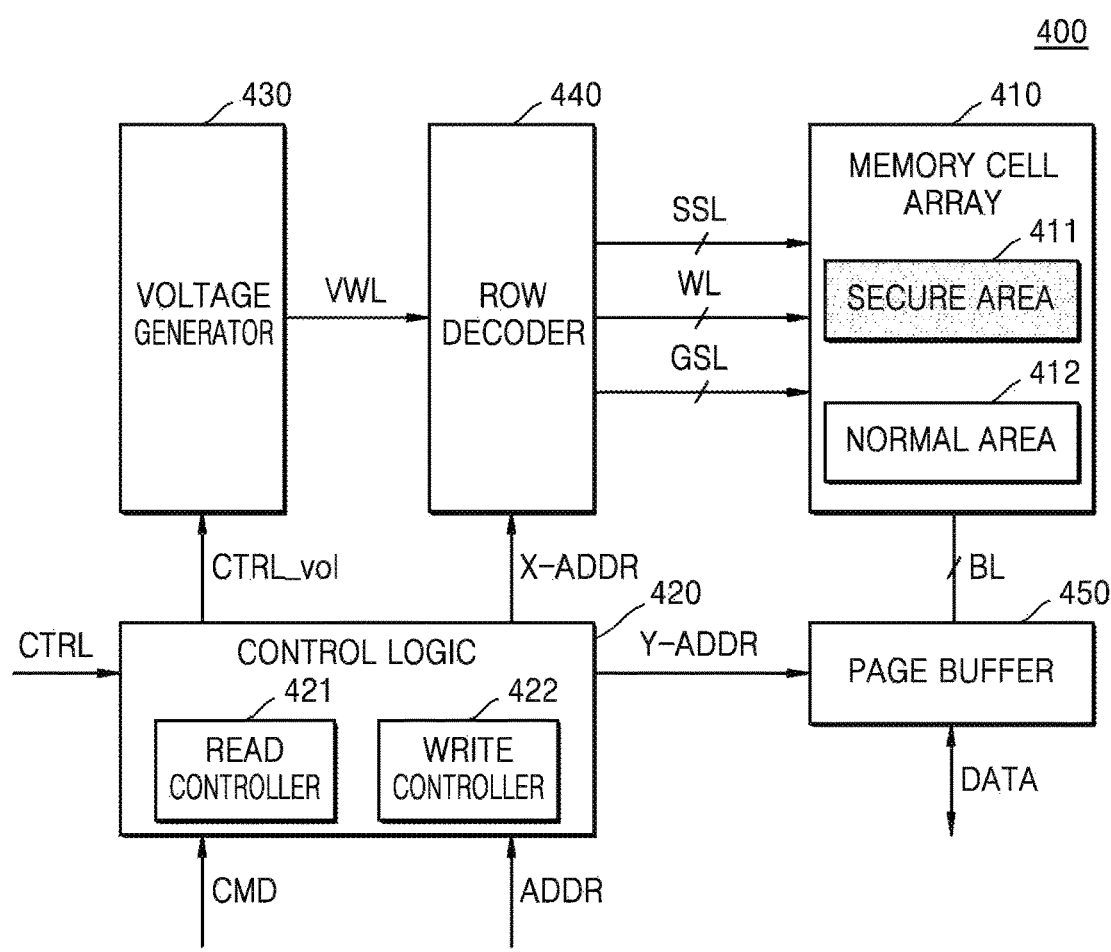
FIG. 13 is a block diagram illustrating a nonvolatile memory according to an embodiment of the inventive concept.

FIG. 13 is a block diagram illustrating a nonvolatile memory according to an embodiment of the inventive concept.

Referring to FIG. 13, a (nonvolatile) memory device 400 according to an embodiment includes a memory cell array 410, a control logic 420, a voltage generator 430, a row decoder 440, and a page buffer 450. The memory cell array 410 includes a secure area 411 and a normal area 412. Although not shown, the memory device 400 may further include a data input/output (I/O) circuit or an I/O interface. The memory device 400 according to the present embodiment may correspond to, for example, the nonvolatile memory 110 of FIG. 5. Also, the secure area 411 and the normal area 412 according to the present embodiment may respectively correspond to, for example, the secure area 111 and normal area 112 of FIG. 5.

The memory cell array 410 may include a plurality of memory cells and may be connected to a plurality of word lines WL, a plurality of string selection lines SSL, a plurality of ground selection lines GSL, and a plurality of bit lines BL. In detail, the memory cell array 410 may be connected to the row decoder 440 through the word lines WL, the string selection lines SSL, and the ground selection lines GSL, and may be connected to the page buffer 450 through the bit lines BL.

The memory cell array 410 may include a plurality of blocks, and each of the blocks may have a three-dimensional (3D) structure (or a vertical structure). In detail, each of the blocks may include a structure which extends along first to third directions. For example, each of the blocks may include a plurality of NAND strings which extend along the third direction. In this case, the plurality of NAND strings may be provided to be spaced apart from each other by a certain distance along the first and second directions. The blocks may be selected by the row decoder 440. For example, the row decoder 440 may select a block corresponding to a block address from among the plurality of blocks.

The memory cell array 410 may include at least one of a single level cell block including a plurality of single level cells, a multi-level cell block including a plurality of multi-level cells, and a triple level cell block including a plurality of triple level cells. In other words, some of a plurality of blocks included in the memory cell array 410 may be single level cell blocks, and the other blocks may be multi-level cell blocks or triple level cell blocks.

The memory cell array 410 may include a plurality of NAND strings, and each of the NAND strings may include a plurality of memory cells respectively connected to the word lines WL which are vertically stacked on a substrate. As described above, in an embodiment, the memory cell array 410 may be a 3D memory array. The 3D memory array may be a circuit that includes an active area disposed on a silicon substrate and that is associated with an operation of each of memory cells, and may be configured in a monolithic type on a physical level of at least one of memory cell arrays each including a circuit which is provided on or in the substrate. The monolithic type may denote that layers of levels configuring an array are stacked just on layers of lower levels of the array.

In an embodiment, the 3D memory array may include a plurality of NAND strings which are arranged in a vertical direction in order for at least one memory cell to be disposed on another memory cell. The at least one memory cell may include a charge trap layer. U.S. Pat. Nos. 7,679,133, 8,553, 466, 8,654,587 and 8,559,235 and U.S. Patent Application No. 2011/0233648 disclose appropriate elements of a 3D memory array which include a plurality of levels and in which word lines and/or bit lines are shared between the plurality of levels. In the present specification, the reference documents may be combined through citation.

The control logic 420 may write data in the memory cell array 410, read the data from the memory cell array 410, or output various control signals for erasing the data stored in the memory cell array 410, based on a command CMD, an address ADDR, and a control signal CTRL received from a nonvolatile memory controller (for example, 130 of FIG. 5). Therefore, the control logic 420 may overall control various operations of the memory device 400.

The various control signals output from the control logic 420 may be supplied to the voltage generator 430, the row decoder 440, and the page buffer 450. In detail, the control logic 420 may supply a voltage control signal CTRL_vol to the voltage generator 430, supply a row address X-ADDR to the row decoder 440, and supply a column address Y-ADDR to the page buffer 450. However, the present embodiment is not limited thereto. In other embodiments, the control logic 420 may further supply various control signals to the voltage generator 430, the row decoder 440, and the page buffer 450.

In the present embodiment, the control logic 420 includes a read controller 421 and a write controller 422. The read controller 421 may control a read operation on a secure area 411 and a normal area 412, based on the command CMD, the address ADDR, or the control signal CTRL. In detail, when a secure signal indicates the secure mode, the read controller 421 may control the read operation on the secure area 411, based on the command CMD, the address ADDR, or the control signal CTRL generated by the nonvolatile memory controller. Also, when the secure signal indicates the non-secure mode, the read controller 421 may control the read operation on the normal area 412, based on the command CMD, the address ADDR, or the control signal CTRL generated by the nonvolatile memory controller.

The write controller 422 may control a write operation on the secure area 411 and the normal area 412, based on the command CMD, the address ADDR, or the control signal CTRL. In detail, when the secure signal indicates the secure mode, the write controller 422 may control the write operation on the secure area 411, based on the command CMD, the address ADDR, or the control signal CTRL generated by the nonvolatile memory controller. Also, when the secure signal indicates the non-secure mode, the write controller 422 may control the write operation on the normal area 412, based on the command CMD, the address ADDR, or the control signal CTRL generated by the nonvolatile memory controller.

The voltage generator 430 may generate various kinds of voltages for performing a program operation, a read operation, and an erase operation on the memory cell array 410, based on the voltage control signal CTRL_vol. In detail, the voltage generator 430 may generate a word line voltage VWL, for example, a program voltage (or a write voltage), a pre-program voltage, a read voltage, a program inhibit voltage, a read inhibit voltage, an erase verification voltage, a program verification voltage, and/or the like. Also, the voltage generator 430 may further generate a string selection line voltage and a ground selection line voltage, based on the voltage control signal CTRL_vol. Also, the voltage generator 430 may further generate a substrate erase voltage which is to be supplied to the memory cell array 410.

The row decoder 440 may select some word lines from among the plurality of word lines WL in response to the row address X-ADDR received from the control logic 420. Also, the row decoder 440 may select some string selection lines from among the plurality of string selection lines SSL or may select some ground selection lines from among the plurality of ground selection lines GSL in response to the row address X-ADDR received from the control logic 420.

The page buffer 450 may be connected to the memory cell array 410 through the bit lines BL and may select some bit lines from among the bit lines BL in response to the column address Y-ADDR received from the control logic 420. In detail, in the read operation, the page buffer 450 may operate as a sense amplifier to sense data DATA stored in the memory cell array 410. Also, in the program operation, the page buffer 450 may operate as a write driver to input data DATA, which is to be stored in the memory cell array 410, to the memory cell array 410.

Figure 14:
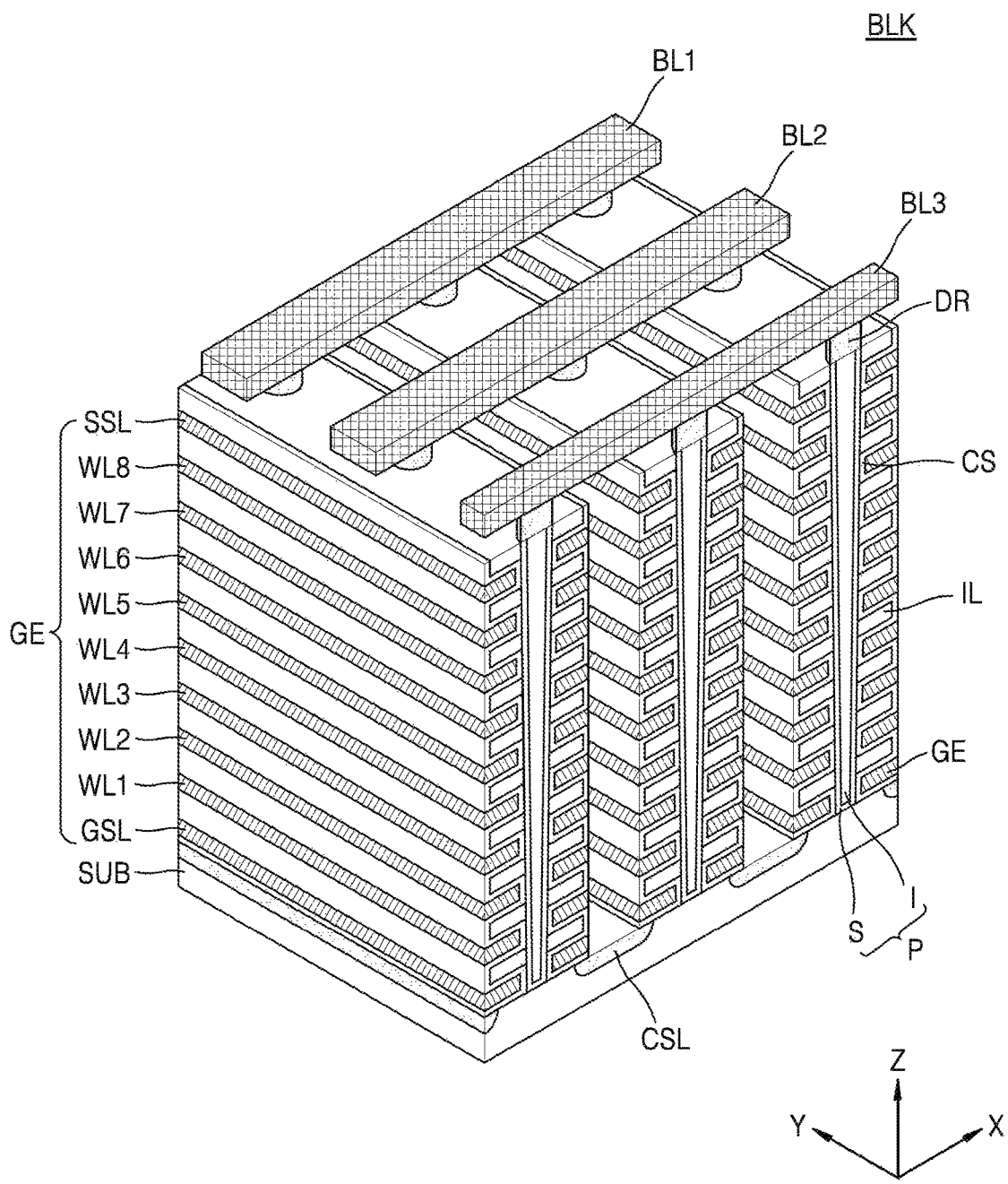
FIG. 14 is a perspective view illustrating a memory cell array according to an embodiment of the inventive concept.

FIG. 14 is a perspective view illustrating a memory cell array according to an embodiment of the inventive concept.

Referring to FIG. 14, the memory cell array according to the present embodiment may correspond to the memory cell array 410 of FIG. 13. The memory cell array may include a plurality of blocks BLK, and each of the blocks BLK may be provided as illustrated in FIG. 14. Each of the blocks BLK may be formed in a vertical direction with respect to a substrate SUB. In FIG. 14, each of the blocks BLK is illustrated as including two selection lines GSL and SSL, eight word lines WL1 to WL8, and three bit lines BL1 to BL3, but may actually include a less number of lines or a more number of lines.

The substrate SUB may have a first conductive type (for example, a p type), and a common source line CSL which extends along a first direction (for example, a Y direction) and on which impurities having a second conductive type (for example, an n type) are doped may be provided on the substrate SUB. A plurality of insulation layers IL which extend along the first direction may be sequentially provided along a third direction (for example, a Z direction) in a region of the substrate SUB between two adjacent common source lines CSL, and may be spaced apart from each other by a certain distance along the third direction. For example, the plurality of insulation layers IL may each include an insulating material such as silicon oxide and/or the like.

A plurality of pillars P which are sequentially disposed along the first direction and pass through the plurality of insulation layers IL along the third direction may be provided in the region of the substrate SUB between the two adjacent common source lines CSL. For example, the plurality of pillars P may pass through the plurality of insulation layers IL and contact the substrate SUB. In detail, a surface layer S of each of the pillars P may include silicon having a first type and may function as a channel region. An inner layer I of each of the pillars P may include an insulating material, such as silicon oxide and/or the like, or an air gap.

A charge storage layer CS may be provided in a region between two adjacent common source lines CSL along the insulation layers IL, the pillars P, and an exposed surface of the substrate SUB. The charge storage layer CS may include a gate insulation layer (or referred to as a tunneling insulation layer), a charge trap layer, and a blocking insulation layer. For example, the charge storage layer CS may have an oxide-nitride-oxide (ONO) structure. Also, a plurality of gate electrodes (GE) such as the selection lines GSL and SSL and the word lines WL1 to WL8 may be provided on an exposed surface of the charge storage layer CS and in a region between two adjacent common source lines CSL.

A plurality of drains or a plurality of drain contacts DR may be provided on the plurality of pillars P, respectively. For example, the drains or the drain contacts DR may each include silicon on which impurities having the second conductive type are doped. The bit lines BL1 to BL3 which extend in a second direction (for example, an X direction) and are disposed to be spaced apart from each other by a certain distance along the first direction may be provided on the drain contacts DR.

Figure 15:
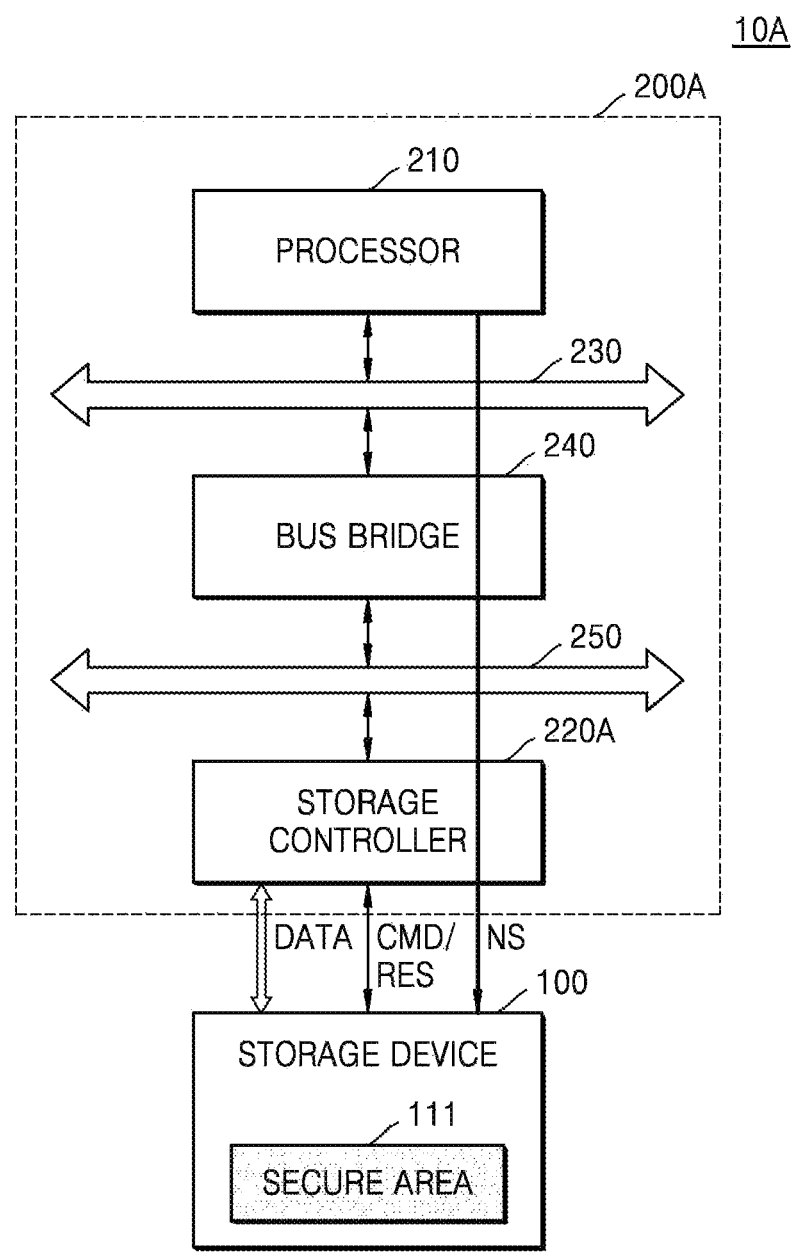
FIG. 15 is a block diagram illustrating an electronic device according to an embodiment of the inventive concept.

FIG. 15 is a block diagram illustrating an electronic device 10A according to an embodiment of the inventive concept.

Referring to FIG. 15, the electronic device 10A includes a storage device 100 and a host 200A. The electronic device 10A according to the FIG. 15 is a modification of the electronic device 10 of FIG. 1. Accordingly, the details of operation and configuration of electronic device 10 in FIG. 1 that are the same may be applied to electronic device 10A in FIG. 15 and may be omitted from the following description. Hereinafter, the following description will focus on the manner in which details of operation and configuration of electronic device 10A in FIG. 15 is different than the electronic device 10 of FIG. 1.

The host 200A includes a processor 210, a storage controller 220A, a first bus 230, a bus bridge 240, and a second bus 250. The host 200A may control a data processing operation (for example, a data read operation or a data write operation) of the storage device 100. In an embodiment, the host 200A may be implemented with an SoC, and thus may be embedded into the electronic device 10A.

The processor 210 may be connected to the first bus 230, and the storage controller 220A may be connected to the second bus 250. The bus bridge 240 may transfer a secure signal NS between the first bus 230 and the second bus 250. Here, the bus bridge 240 may connect different types of buses, namely, the first bus 230 and the second bus 250. As described above, in the present embodiment, the storage controller 220A may be indirectly connected to the first bus 230 through the bus bridge 240.

The storage controller 220A may supply the secure signal NS to the storage device 100 to control the storage device 100 to the secure mode or the non-secure mode. Therefore, the secure mode or the non-secure mode executed by the host 200A may be expanded to the storage device 100, and hardware-based security in a storage level is further reinforced. In the present embodiment, the storage controller 220A may include a secure signal terminal for supplying the secure signal NS.

Figure 16:
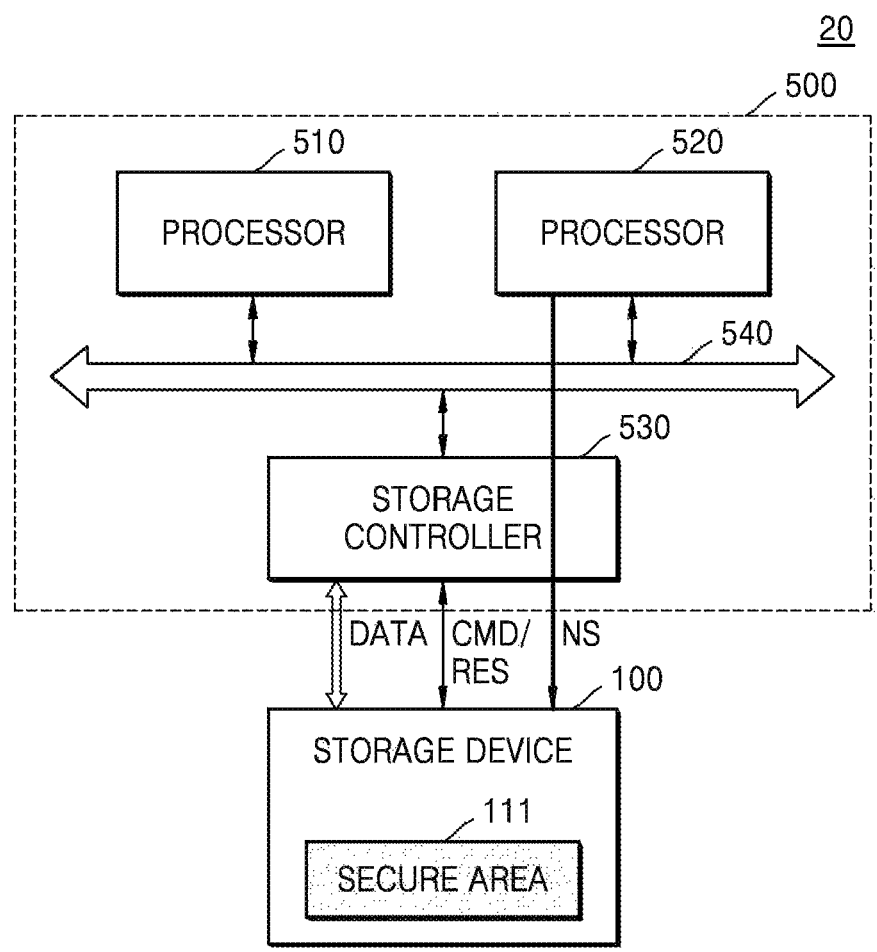
FIG. 16 is a block diagram illustrating an electronic device according to an embodiment of the inventive concept.

FIG. 16 is a block diagram illustrating an electronic device 20 according to an embodiment of the inventive concept.

Referring to FIG. 16, the electronic device 20 includes a storage device 100 and a host 500. The electronic device 20 according to the present embodiment is a modification of the electronic device 10 of FIG. 1. In detail, the electronic device 20 according to the present embodiment may include the host 500 unlike the electronic device 10 of FIG. 1, and the storage device 100 may be implemented substantially identical to the storage device 100 of FIG. 1. Thus, the details of the storage device 100 described above with reference to FIGS. 1 to 14 may be applied to the present embodiment.

The host 500 includes a first processor 510, a second processor 520, a storage controller 530, and a bus 540. The host 500 may control a data processing operation (for example, a data read operation or a data write operation) of the storage device 100. In an embodiment, the host 500 may be implemented with an SoC, and thus may be embedded into the electronic device 20.

In the present embodiment, the host 500 may include the first and second processors 510 and 520 which are physically independent from each other. The first processor 510 may be a general-use processor that operates in the non-secure mode, and the second processor 520 may be a secure processor that operates in the secure mode. The second processor 520 may be driven by a secure OS according to a secure signal NS.

Figure 17:
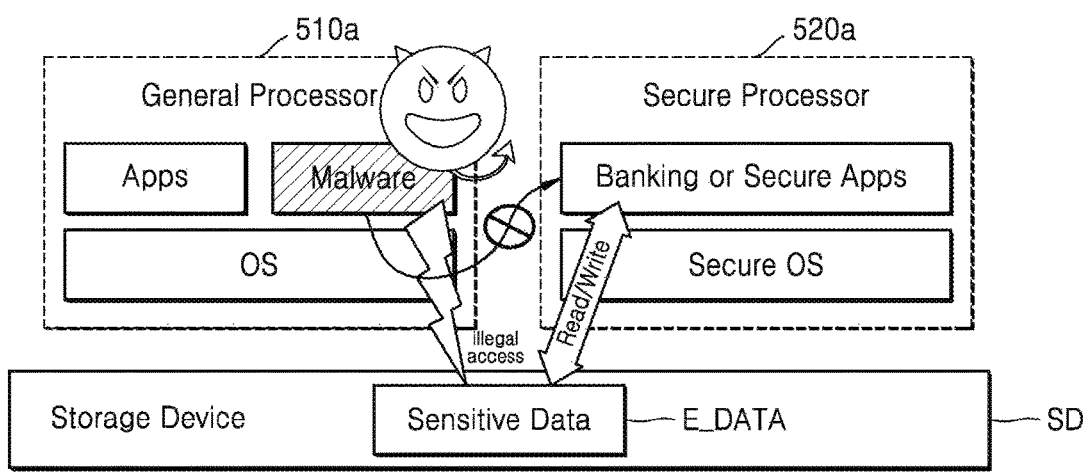
FIG. 17 is a block diagram illustrating a plurality of processors according to an embodiment.

FIG. 17 is a block diagram illustrating a plurality of processors 510a and 520a according to an embodiment.

Referring to FIG. 17, a general-use processor 510a may be an example of the first processor 510 of FIG. 16, and a secure processor 520a may be an example of the second processor 520 of FIG. 16. The general-use processor 510a may be driven by an OS, and applications may operate. The secure processor 520a may be driven by a secure OS, and a secure application such as a banking application or the like may operate. As described above, by using two the processors 510a and 520a which are physically separated from each other, a malicious program executed by the general-use processor 510a is prevented from accessing a secure application which is executed in the secure processor 520a.

However, when general-use processors such as general-use processor 510a and secure processors such as secure processor 520a shown in FIG. 17 share a storage device SD, a malicious program may illegally access encrypted data E_DATA stored in the storage device SD. The malicious program may continuously transmit the encrypted data E_DATA to a remote server, and the remote server may decrypt the encrypted data E_DATA to steal sensitive data. Alternatively, the malicious program may modulate the encrypted data E_DATA through fault injection. As described above, the same problem as that illustrated in FIG. 3 may occur despite using the two processors 510a and 520a which are physically separated from each other.

Referring again to FIG. 16, the storage controller 530 may supply the secure signal NS to the storage device 100 to control the storage device 100 to the secure mode or the non-secure mode. Therefore, the secure mode or the non-secure mode executed by the host 500 may be expanded to the storage device 100, and hardware-based security in a storage level is further reinforced. In the present embodiment, the storage controller 530 may include a secure signal terminal for supplying the secure signal NS. The storage controller 530 may be implemented substantially similar to the storage controller 220 illustrated in FIG. 4.

The bus 540 may transfer the secure signal NS between the second processor 520 and the storage controller 530. In the present embodiment, the storage controller 530 may be directly connected to the bus 540. For example, the bus 540 may be an AXI bus. The bus 540 according to the present embodiment may be implemented substantially identical to the bus 230 illustrated in FIG. 1.

Figure 18:
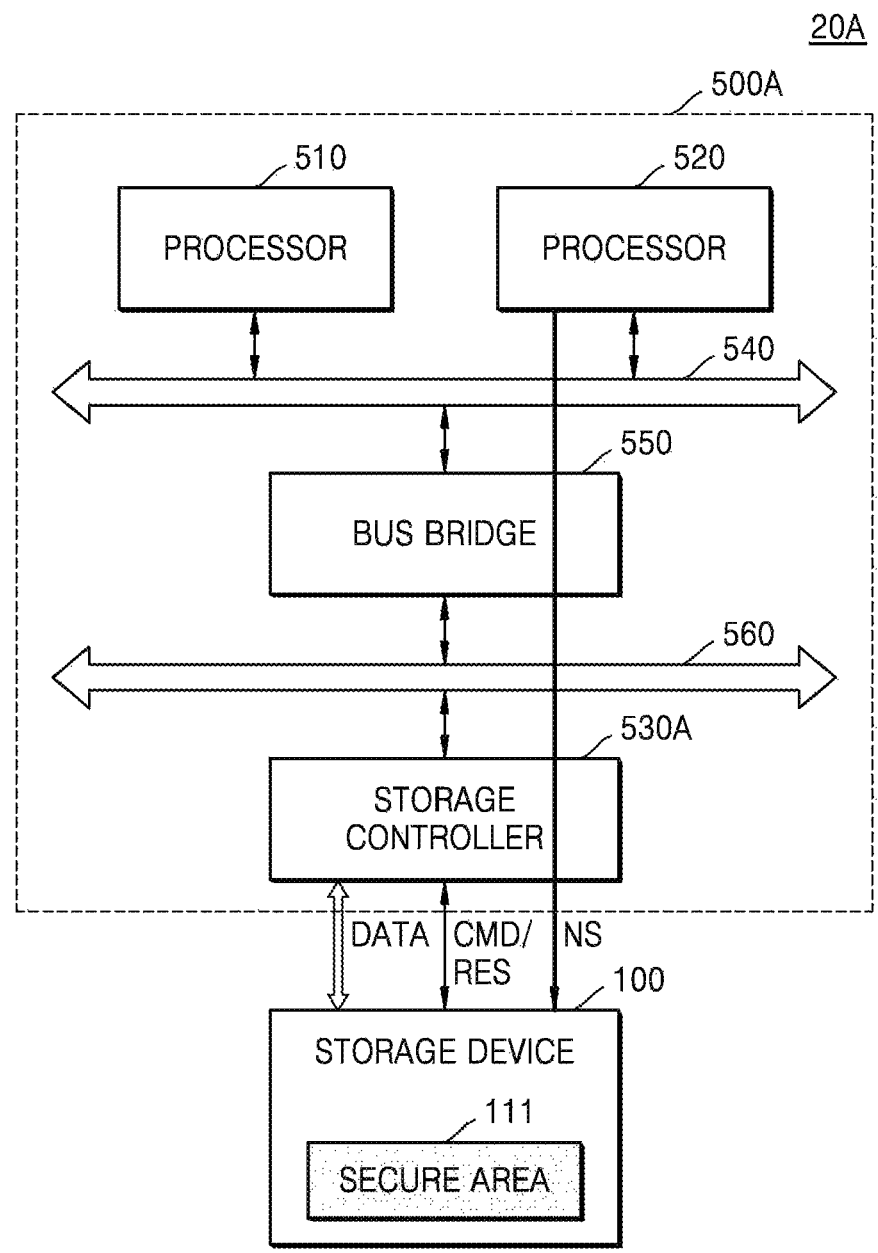
FIG. 18 is a block diagram illustrating an electronic device according to an embodiment of the inventive concept.

FIG. 18 is a block diagram illustrating an electronic device 20A according to an embodiment of the inventive concept.

Referring to FIG. 18, the electronic device 20A includes a storage device 100 and a host 500A. The electronic device 20A according to the present embodiment is a modification of the electronic device 20 of FIG. 16. In detail, the electronic device 20A according to the present embodiment includes the host 500A unlike the electronic device 20 of FIG. 16, and the storage device 100 may be implemented substantially identical to the storage device 100 of FIG. 16. Thus, the details of the storage device 100 described above with reference to FIGS. 16 and 17 may be applied to the present embodiment, and repetitive description may be omitted.

The host 500A includes a first processor 510, a second processor 520, a storage controller 530A, a first bus 540, a bus bridge 550, and a second bus 560. The host 500A may control a data processing operation (for example, a data read operation or a data write operation) of the storage device 100. In an embodiment, the host 500A may be implemented with an SoC, and thus may be embedded into the electronic device 20A.

The first and second processors 510 and 520 may be connected to the first bus 540, and the storage controller 530A may be connected to the second bus 560. The bus bridge 550 may transfer a secure signal NS between the first bus 540 and the second bus 560. Here, the bus bridge 550 may connect different types of buses, namely, the first bus 540 and the second bus 560. As described above, in the present embodiment, the storage controller 530A may be indirectly connected to the first bus 540 through the bus bridge 550.

The storage controller 530A may supply the secure signal NS to the storage device 100 to control the storage device 100 to the secure mode or the non-secure mode. Therefore, the secure mode or the non-secure mode executed by the host 500A may be expanded to the storage device 100, and hardware-based security in a storage level is further reinforced. In the present embodiment, the storage controller 530A may include a secure signal terminal for supplying the secure signal NS.

Figure 19:
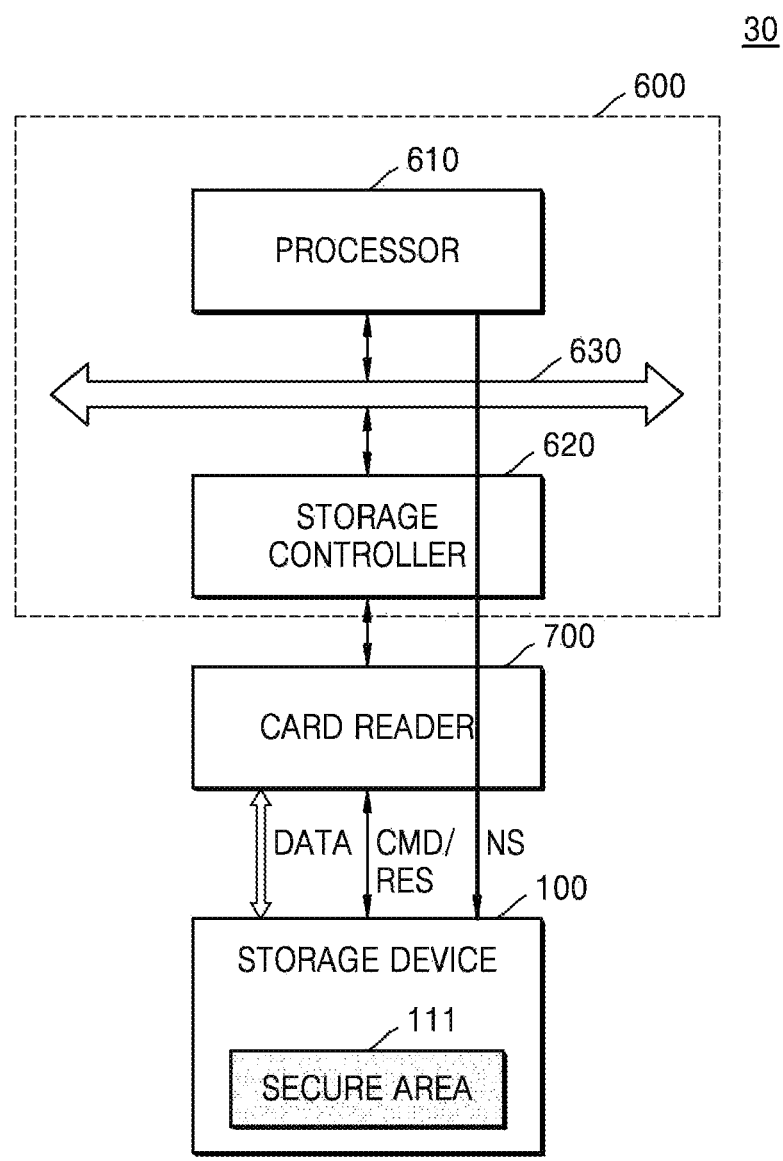
FIG. 19 is a block diagram illustrating an electronic system according to an embodiment of the inventive concept.

FIG. 19 is a block diagram illustrating an electronic system 30 according to an embodiment of the inventive concept.

Referring to FIG. 19, the electronic system 30 includes a storage device 100, a host 600, and a card reader 700.

According to an embodiment, the storage device 100 may be an external memory detachable/attachable from/to the electronic system 30. The details described above with reference to FIGS. 1 to 14 may be applied to the present embodiment.

The host 600 includes a processor 610, a storage controller 620, and a bus 630. The host 600 may control a data processing operation (for example, a data read operation or a data write operation) of the storage device 100. In an embodiment, the host 600 may be implemented with or as an SoC. In an embodiment, the host 600 may be implemented with an electronic device. For example, the electronic device may be a personal computer (PC), a laptop computer, a mobile phone, a smartphone, a tablet PC, a personal digital assistant (PDA), an enterprise digital assistant (EDA), a digital still camera, a digital video camera, an audio device, a portable multimedia player (PMP), a personal navigation device or a portable navigation device (PND), an MP3 player, a handheld game console, an e-book, or the like. Also, the electronic device may be, for example, one of various types of devices such as wristwatches, wearable devices such as head-mounted displays (HMDs), or the like.

The processor 610 may be driven by a secure OS or a normal OS according to a secure signal NS. For example, the processor 610 may support a TrustZone®. The bus 630 may transfer the secure signal NS between the processor 610 and the storage controller 620. The processor 610 and the bus 630 may respectively correspond to the processor 210 and the bus 230 of FIG. 1, and the details described above with reference to FIGS. 1 and 2 may be applied to the present embodiment.

The storage controller 620 may supply the secure signal NS to the storage device 100 to control the storage device 100 to the secure mode or the non-secure mode. Therefore, the secure mode or the non-secure mode executed by the host 600 may be expanded to the storage device 100, and hardware-based security in a storage level is further reinforced. In the present embodiment, the storage controller 620 may include a secure signal terminal for supplying the secure signal NS. The storage controller 620 may be implemented substantially similar to the storage controller 220 illustrated in FIG. 4.

The card reader 700 may connect the storage device 100 to the host 600 to transmit data, stored in the storage device 100, to the host 600. Also, the card reader 700 may transmit data, included in the host 600, to the storage device 100. As described above, the card reader 700 may support an operation of reading data and an operation of writing data.

Figure 20:
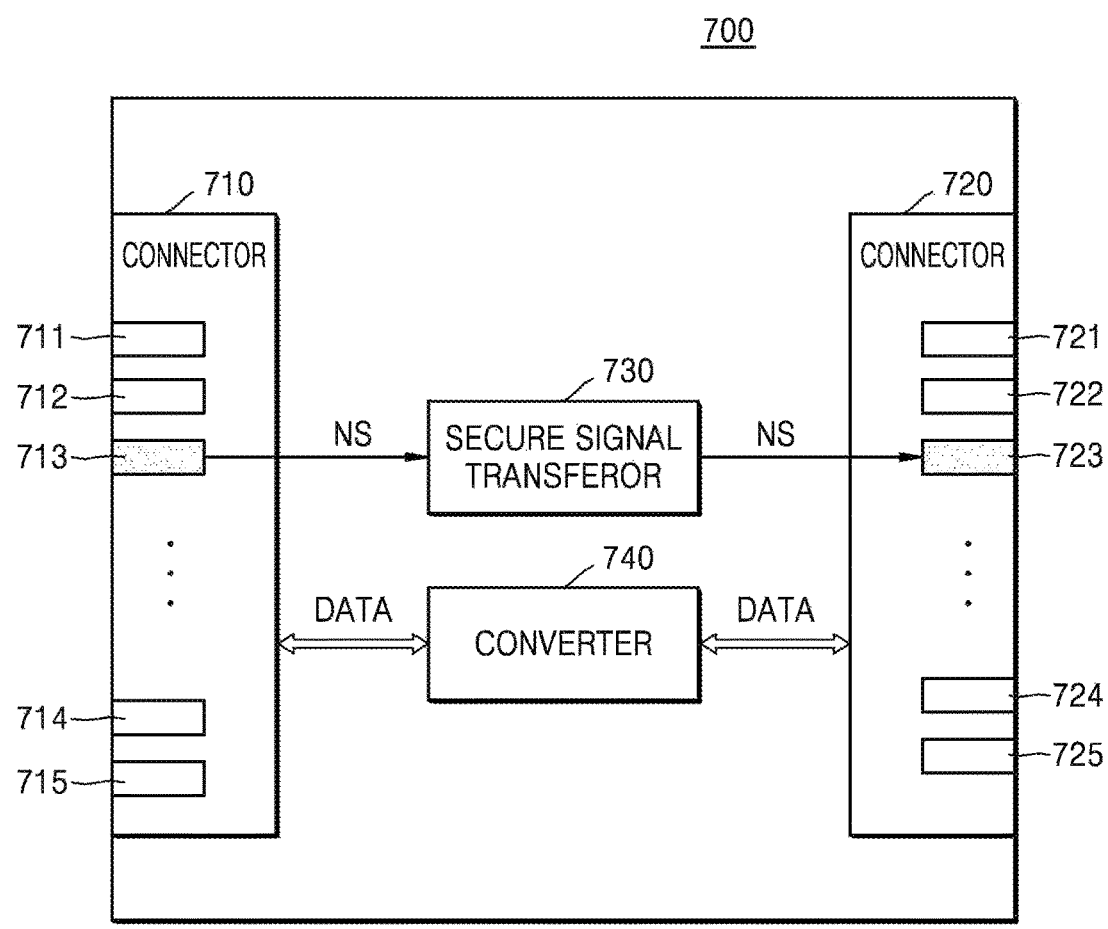
FIG. 20 is a block diagram illustrating a card reader according to an embodiment of the inventive concept.

FIG. 20 is a block diagram illustrating a card reader 700 according to an embodiment of the inventive concept.

Referring to FIG. 20, the card reader 700 includes a first connector 710, a second connector 720, a secure signal transferor 730, and a converter 740. Hereinafter, a configuration of the card reader 700 will be described in detail with reference to FIGS. 19 and 20.

The first connector 710 may include a plurality of first connection terminals 711 to 715 connectable to the host 600, and may be referred to as a first port. For example, the plurality of first connection terminals 711 to 715 may be implemented with pins, pads, or communication lines. Hereinafter, an embodiment where the plurality of first connection terminals 711 to 715 are implemented with pins will be described.

A first secure signal pin 713 for receiving a secure signal NS indicating the secure mode or the non-secure mode from the host 600 may be included among the plurality of first connection pins 711 to 715. The first secure signal pin 713 may be a dedicated pin through which the secure signal NS is transferred. However, the present embodiment is not limited thereto. In some embodiments, the secure signal NS may be transferred through two or more of the plurality of first connection pins 711 to 715. For example, secure signal NS including bits AWPORT[1] and ARPORT[1] may be respectively transferred through two of the plurality of first connection pins 711 to 715. In an embodiment, the first secure signal pin 713 may be a reserved pin in the standard specification. In an embodiment, the first secure signal pin 713 may be a new or added pin.

The second connector 720 may include a plurality of second connection terminals 721 to 725 connectable to the storage device 100, and may be referred to as a second port. For example, the plurality of second connection terminals 721 to 725 may be implemented with pins, pads, or communication lines. Hereinafter, an embodiment where the plurality of second connection terminals 721 to 725 are implemented with pins will be described.

One of the plurality of second connection pins 721 to 725 may correspond to a second secure signal pin 723 for transferring the secure signal NS to the storage device 100. The second secure signal pin 723 may be a dedicated pin through which the secure signal NS is transferred. However, the present embodiment is not limited thereto. In some embodiments, the secure signal NS may be transferred through two or more of the plurality of second connection pins 721 to 725. For example, secure signal NS including bits AWPORT[1] and ARPORT[1] may be respectively transferred through two of the plurality of second connection pins 721 to 725. In an embodiment, the second secure signal pin 723 may be a reserved pin in the standard specification. In an embodiment, the second secure signal pin 723 may be a new or added pin.

The secure signal transferor 730 may transfer the secure signal NS, received from the first secure signal pin 713, to the second secure signal pin 723. The converter 740 may convert a signal (DATA), received from the host 600 through the first connector 710, into a storage signal (DATA) which is transmitted through the second connector 720 to the storage device 100. Here, the storage signal may be determined based on an interface protocol for communicating with the storage device 100. Also, the converter 740 may convert a signal, received from the storage device 100 through the second connector 720, into a host signal which is transmitted through the first connector 710 to host 600. Here, the host signal may be determined based on an interface protocol for communicating with the host 600.

Figure 21:
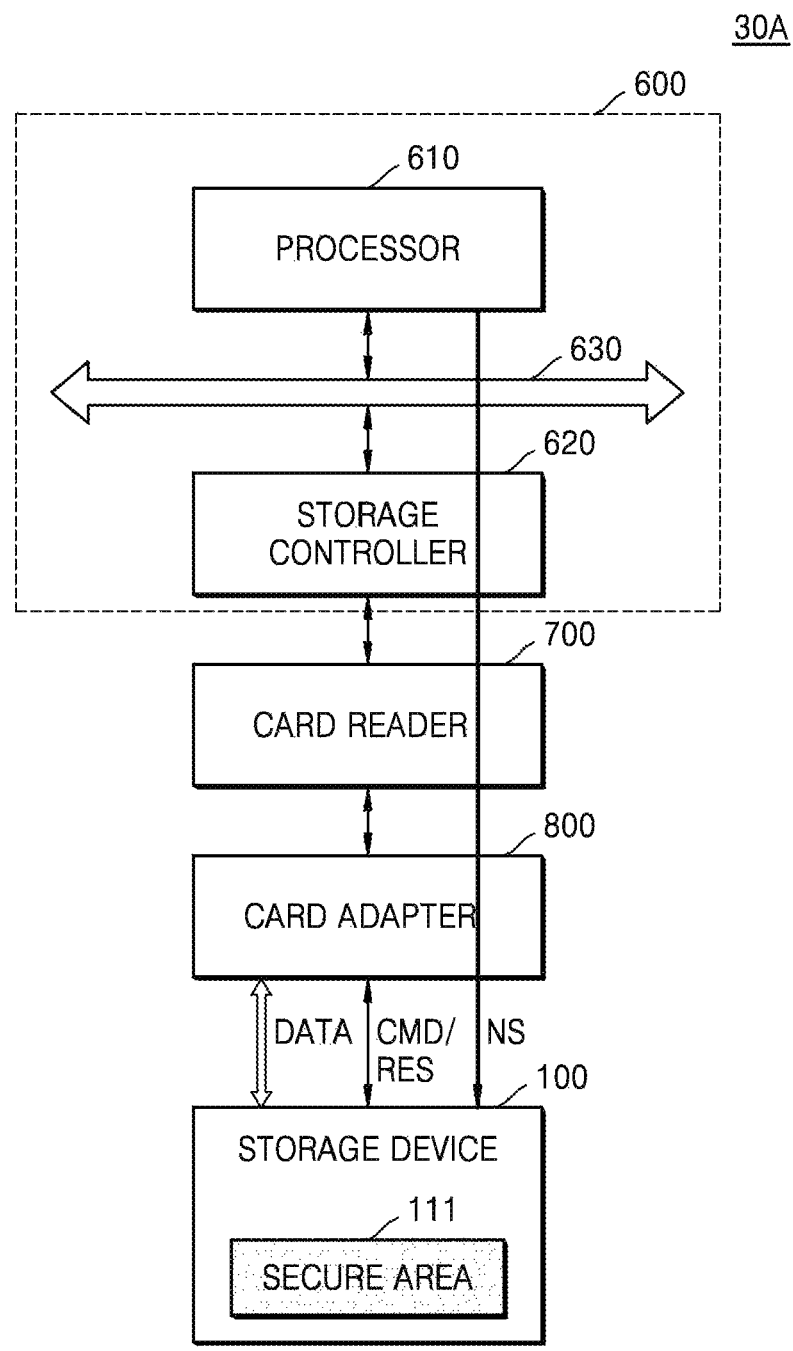
FIG. 21 is a block diagram illustrating an electronic system according to an embodiment of the inventive concept.

FIG. 21 is a block diagram illustrating an electronic system 30A according to an embodiment of the inventive concept.

Referring to FIG. 21, the electronic system 30A includes a storage device 100, a host 600, a card reader 700, and a card adapter 800. The electronic system 30A according to the present embodiment is a modification of the electronic system 30 of FIG. 19. In detail, the electronic system 30A may further include the card adapter 800 unlike the electronic system 30 of FIG. 19. The details described above with reference to FIGS. 19 and 20 may be applied to the present embodiment.

In general, a variety of storage devices may be provided as storage device 100, each having various different standards, various different shapes or sizes depending on the type of storage device, and various different electric characteristics or operations. For this reason, the storage device 100 may be insufficient for general-usability with the host 600. The card adapter 800 may be used for accommodating the storage device 100 having various shapes or sizes. For example, the storage device 100 having a small size may be mounted on the card adapter 800, and by connecting the card adapter 800 to the card reader 700, the storage device 100 may transmit or receive data to or from the host 600.

Figure 22A:
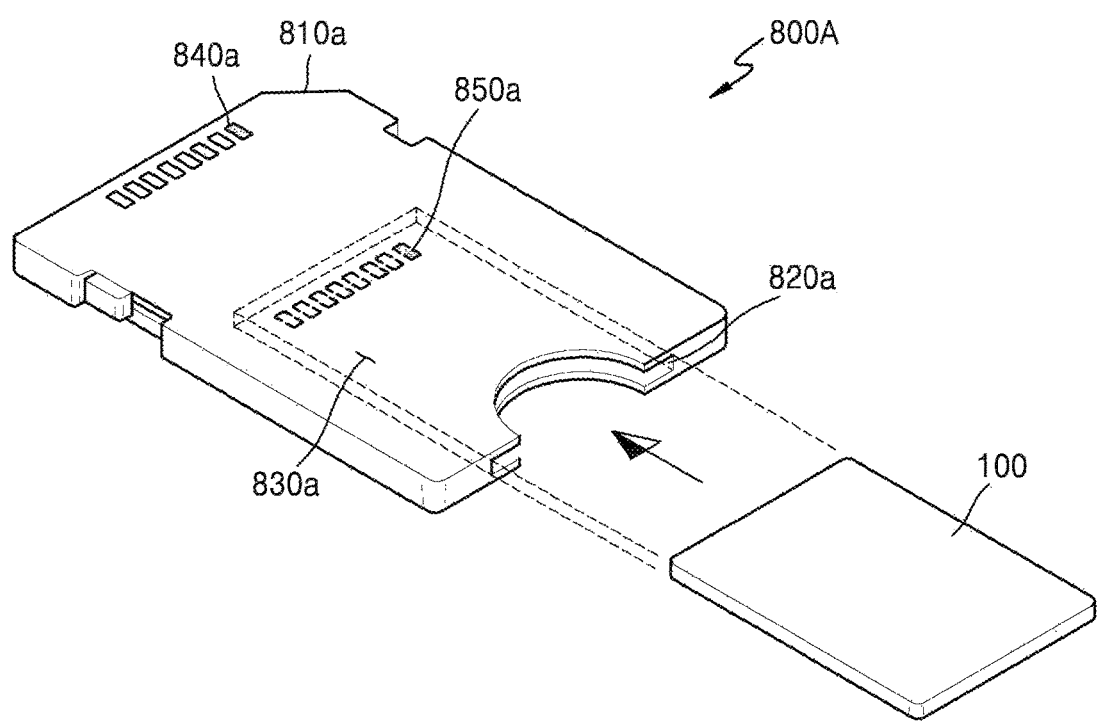
FIGS. 22A and 22B are perspective views illustrating a plurality of card adapters according to some embodiments of the inventive concept.
Figure 22B:
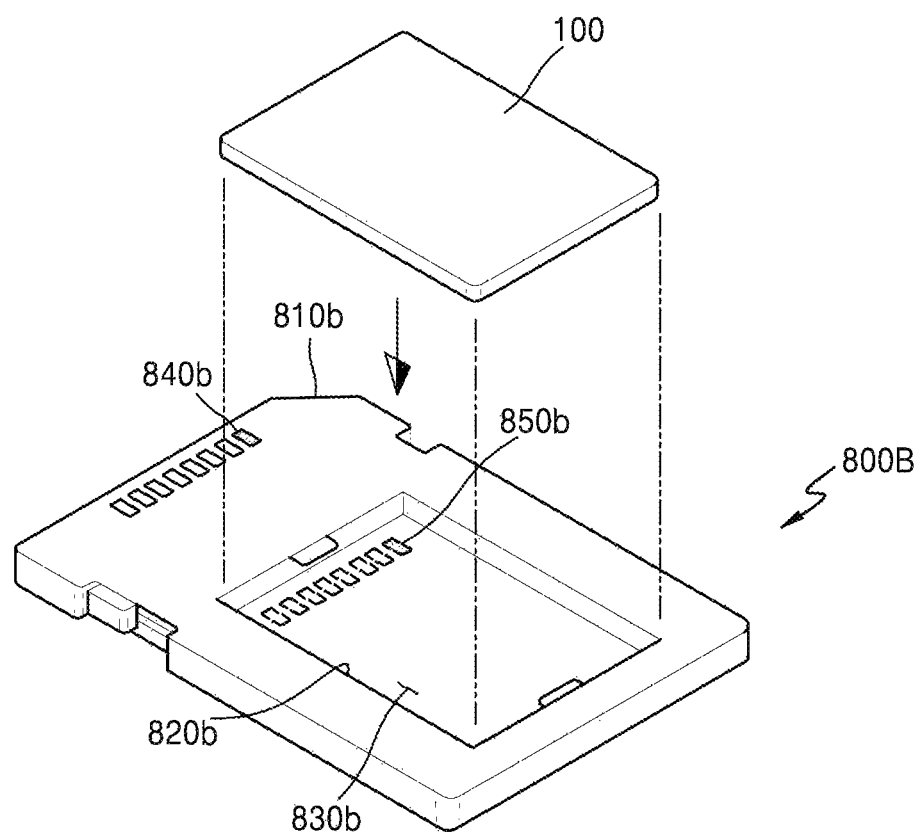

FIGS. 22A and 22B are perspective views illustrating a plurality of card adapters 800A and 800B according to some embodiments of the inventive concept. Hereinafter, the card adapters 800A and 800B will be described with reference to FIGS. 21, 22A and 22B.

Referring to FIG. 22A, the card adapter 800A includes an adapter body 810*a*, a card insertion inlet 820*a*, a card accommodation space 830*a*, a plurality of first connection pins 840*a* and a plurality of second connection pins 850*a*. The card adapter 800A may have a structure where the card accommodation space 830*a* is provided in order for the storage device 100 to be inserted and accommodated into the adapter body 810*a*. At least one of the first connection pins 840*a* may correspond to a first secure signal pin for receiving a secure signal NS indicating the secure mode or the non-secure mode from the card reader 700. At least one of the second connection pins 850*a* may correspond to a second secure signal pin for providing the secure signal NS indicating the secure mode or the non-secure mode to the storage device 100. The first and second secure signal pin may be dedicated pins for transferring the secure signal NS.

Referring to FIG. 22B, the card adapter 800B includes an adapter body 810*b*, a card insertion inlet 820*b*, a card accommodation space 830*b*, a plurality of first connection pines 840*b* and a plurality of second connection pins 850*b*. The card adapter 800B may have a structure where the card insertion inlet 820*b* is provided in order for the storage device 100 to be inserted into the card accommodation space 830*b* through an upper surface of the adapter body 810*b*. At least one of the first connection pins 840*b* may correspond to a first secure signal pin for receiving a secure signal NS indicating the secure mode or the non-secure mode from the card reader 700. At least one of the second connection pins 850*b* may correspond to a second secure signal pin for providing the secure signal NS indicating the secure mode or the non-secure mode to the storage device 100. The first and second secure signal pins may be dedicated pins for transferring the secure signal NS.

Referring to FIGS. 21, 22A and 22B, in embodiments the card adapter 800A and the card adapter 800B each include for example a first connector including a plurality of first connection pins (first connection terminals) connectable to the card reader 700. One of these plurality of first connection pins 840*a* and 840*b* in each of card adapter 800A and card adapter 800B is a first connection pin (first secure signal terminal) that receives from the card reader 700 the secure signal indicating a secure mode or a non-secure mode. The card adapter 800A and the card adapter 800B each further include for example a second connector including a plurality of second connection pins (second connection terminals) 850*a* and 850*b* connectable to the storage device 100. One of these plurality of second connection pins (second connection terminals) 850*a* and 850*b* in each of the card adapter 800A and card adapter 800B is a connection terminal (second secure connection terminal) that provides the secure signal to storage device 100.

Figure 23:
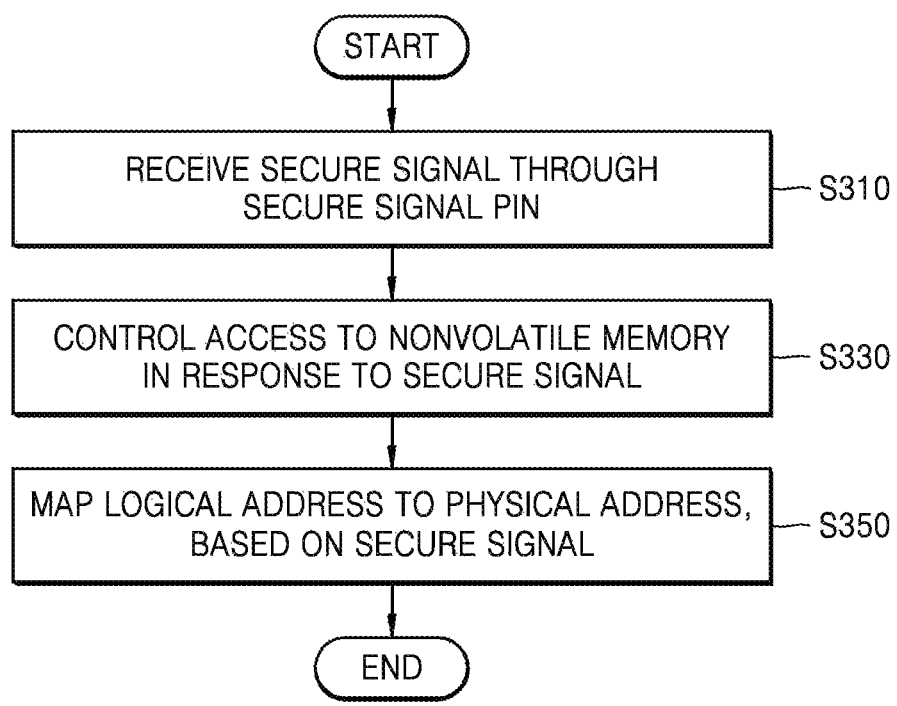
FIG. 23 is a flowchart illustrating a method of operating a storage device according to an embodiment of the inventive concept.

FIG. 23 is a flowchart illustrating a method of operating a storage device according to an embodiment of the inventive concept.

Referring to FIG. 23, the method of operating a storage device according to an embodiment may be a method of operating a storage device including a nonvolatile memory which includes a secure area and a normal area, and for example, may include operations which are time-serially performed in the storage device 100 of FIG. 1. The details described above with reference to FIGS. 1 to 22 may be applied to the present embodiment, and repetitive description may be omitted.

In operation S310, a secure signal indicating the secure mode or the non-secure mode may be received through a secure signal pin which is one of a plurality of pins connectable to an external device. For example, the storage device 100 may receive the secure signal NS through a dedicated secure signal terminal for receiving the secure signal NS.

In operation S330, the storage device may control access to the nonvolatile memory in response to the secure signal. For example, in response to the secure signal, the storage device 100 may control access to the nonvolatile memory so that when the secure signal indicates the secure mode, it is possible to access the secure area, and when the secure signal indicates the non-secure mode, it is possible to access the normal area and it is not possible to access the secure area.

In operation S350, the storage device may map a logical address, received from an external device, to a physical address of the nonvolatile memory, based on the secure signal. For example, the storage device 100 may perform a primary mapping operation of combining the secure signal and the logical address, respectively received through different pins from the host 200, to generate a first address and may perform a secondary mapping operation of mapping the first address to a second address which is a physical address.

Moreover, the method of operating a storage device may further include, when the secure signal indicates the secure more, authenticating the secure mode. The authenticating of the secure mode such as described with respect to FIG. 11 may be used.

Figure 24:
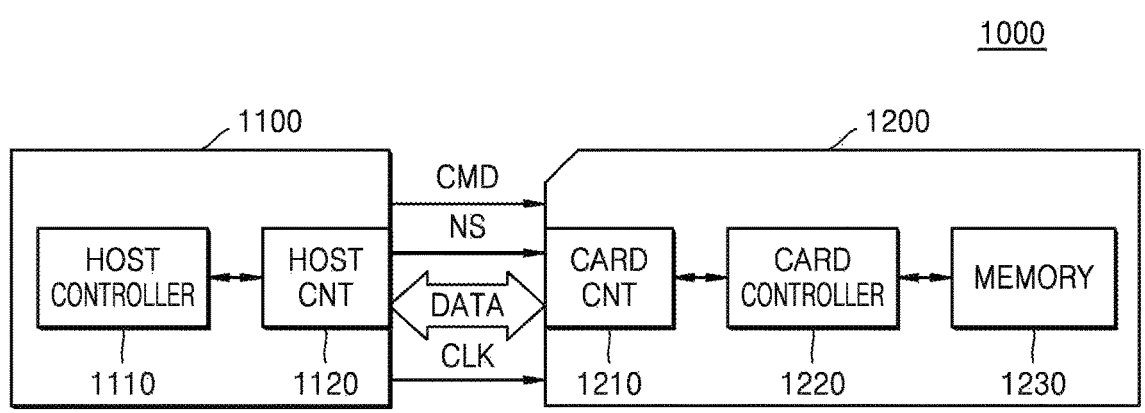
FIG. 24 is a block diagram illustrating a memory card system according to an embodiment of the inventive concept.

FIG. 24 is a block diagram illustrating a memory card system 1000 according to an embodiment of the inventive concept.

Referring to FIG. 24, the memory card system 1000 includes a host 1100 and a memory card 1200. The host 1100 includes a host controller 1110 and a host connector 1120. The memory card 1200 includes a card connector 1210, a card controller 1220, and a memory device 1230. In this case, the memory card 1200 may be implemented by using the embodiments of FIGS. 1 to 23.

The memory card 1200 may communicate with the host 1100 through at least one of various interface protocols such as ATA, SATA, e-SATA, PATA, SCSI, SAS, PCI, PCIe, IEEE 1394, USB, ESDI, IDE, SD card, MMC, eMMC, UFS, and CF card interface.

The host 1100 may write data in the memory card 1200 or may read data stored in the memory card 1200. The host controller 1110 may transmit a command CMD, a clock signal CLK generated by a clock generator (not shown) included in the host 1100, and data DATA to the memory card 1200 through the host connector 1120. The host controller 1110 may supply the secure signal NS to the memory card 1200, for expanding the secure mode for the memory card 1200. The host connector 1120 may include a dedicated secure signal pin for transferring the secure signal NS.

The card connector 1210 may include a dedicated secure signal pin for receiving the secure signal NS. The card connector 1210 may correspond to, for example, the connector 120 of FIG. 5. The card controller 1220 may store data in the memory device 1230 in synchronization with a clock signal generated by a clock generator included in the card controller 1220, in response to a command received through the card connector 1210. The card controller 1220 may determine whether it is possible to access a secure area of the memory device 1230 according to the secure signal NS, and may control the memory device 1230 according to a result of the determination. The memory device 1230 may store data transmitted from the host 1100.

The memory card 1200 may be implemented for example with a compact flash card (CFC), a Microdrive, a smart media card (SMC), a multimedia card (MMC), a security digital card (SDC), a memory stick, a universal serial bus (USB) flash memory driver, and/or the like.

Figure 25:
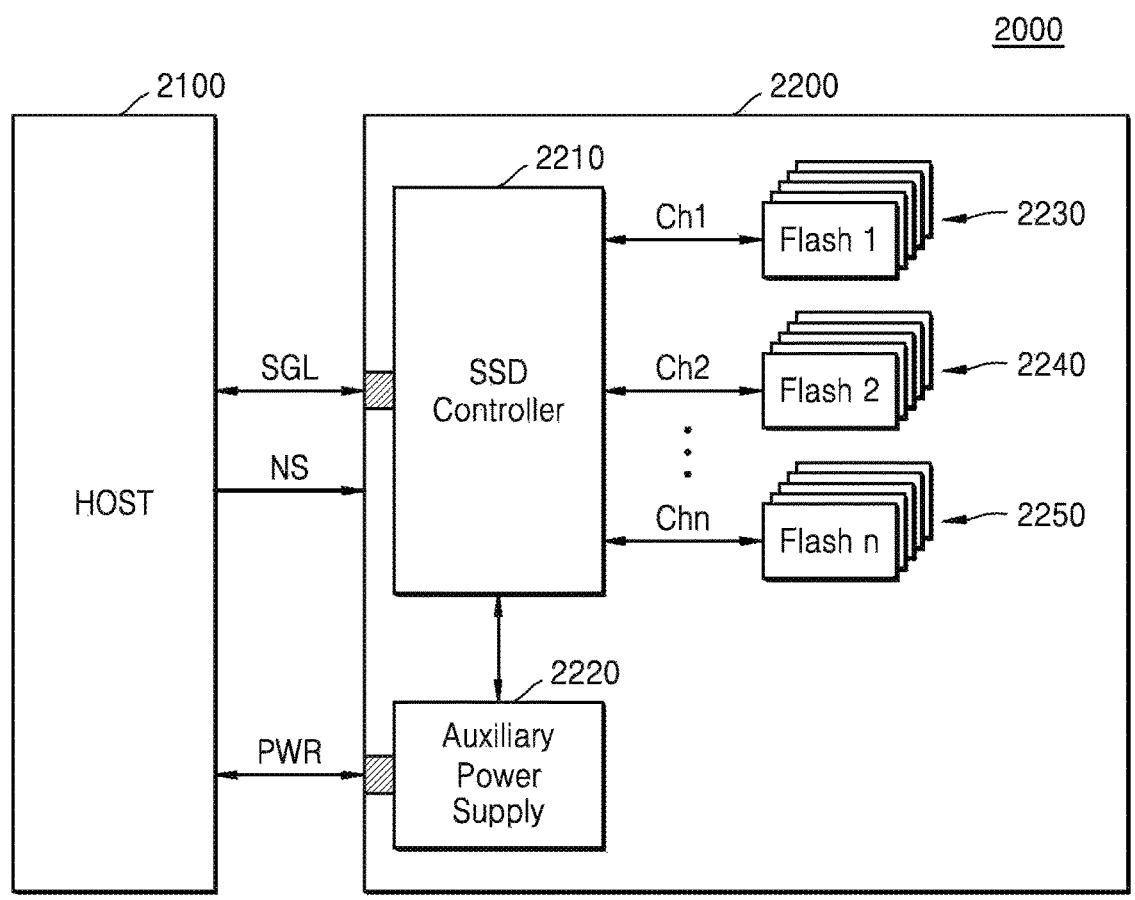
FIG. 25 is a block diagram illustrating a solid state disk (SSD) system according to an embodiment of the inventive concept.

FIG. 25 is a block diagram illustrating a solid state drive (SSD) system 2000 according to an embodiment of the inventive concept.

Referring to FIG. 25, the SSD system 2000 includes a host 2100 and an SSD 2200. The SSD 2200 may transmit or receive a signal SGL to or from the host 2100 through a signal connector and may receive power PWR through a power connector. The SSD 2200 includes an SSD controller 2210, an auxiliary power supply 2220, and a plurality of memory devices 2230, 2240 and 2250 connected to SSD controller 2210 via respective channels Ch1, Ch2 and Chn for example. In this case, the SSD 2200 may be implemented by using the exemplary embodiments of FIGS. 1 to 14.

In the present embodiment, the host 2100 may supply a secure signal NS to the SSD 2200, for expanding the secure mode for the SSD 2200. The host 2100 may include a dedicated secure signal pin for transferring the secure signal NS. The signal connector may include a dedicated secure signal pin for receiving the secure signal NS. Also, the SSD 2200 may include a dedicated secure signal pin for receiving the secure signal NS. The SSD controller 2210 may determine whether it is possible to access a secure area of each of the memory devices 2230, 2240 and 2250 according to the secure signal NS, and may control the memory devices 2230, 2240 and 2250 according to a result of the determination.

While the inventive concept has been particularly shown and described with reference to exemplary embodiments thereof, it will be understood that various changes in form and details may be made therein without departing from the spirit and scope of the following claims.

What is claimed is:

1. A storage device comprising:
   a connector including a plurality of connection terminals connectable to an external device, the plurality of connection terminals including a first terminal corresponding to a secure signal terminal configured to receive a secure signal, that indicates a secure mode or a non-secure mode, from the external device, a second terminal configured to receive a logical address from the external device, and a third terminal configured to receive a digital signature or a password from the external device;
   a nonvolatile memory including a secure area, which is accessible when the secure signal indicates the secure mode, and a normal area that is accessible when the secure signal indicates the non-secure mode, wherein the secure area is not accessible when the secure signal indicates the non-secure mode; and
   a nonvolatile memory controller configured to determine, based on the secure signal, whether to enable access to the secure area, and to control the nonvolatile memory according to a result of the determination,
   wherein the nonvolatile memory controller comprises
   an address mapping module configured to receive the logical address and the secure signal from the external device, to generate a first address by combining the logical address and the secure signal, and to map the first address to a second address corresponding to a physical address of the nonvolatile memory, and
   an authentication module configured to receive the digital signature or the password from the external device, to authenticate the external device when the secure signal indicates the secure mode by using the digital signature or the password, and to determine whether to enable access to the secure area, based on a result of the authentication.

2. The storage device of claim 1, wherein the nonvolatile memory controller further comprises an access control module configured to enable access to the secure area and the normal area when the secure signal indicates the secure mode, and to enable access to the normal area when the secure signal indicates the non-secure mode.

3. The storage device of claim 1, wherein
   the secure signal is a non-secure (NS) bit signal,
   when the NS bit signal is at a first logic level, the NS bit signal indicates the secure mode, and
   when the NS bit signal is at a second logic level, the NS bit signal indicates the non-secure mode.

4. The storage device of claim 1, wherein when the secure signal indicates the secure mode, the storage device operates in the secure mode.

5. The storage device of claim 1, wherein the storage device comprises at least one of an embedded multimedia card (e-MMC), a universal flash storage (UFS), a micro-secure digital (SD) card, and a solid state drive (SSD).

6. The storage device of claim 1, wherein the secure signal terminal is a dedicated terminal configured to receive the secure signal.

7. The storage device of claim 1, wherein the secure area is visible when the secure signal indicates the secure mode.

8. The storage device of claim 1, wherein the authentication module is configured to perform an authentication operation on the external device when the secure signal indicates the secure mode, and
   the authentication module is configured to not perform the authentication operation on the external device when the secure signal indicates the non-secure mode.

9. An electronic device comprising:
   a system-on-a-chip (SoC) including a storage controller configured to supply a secure signal through a first secure signal terminal; and
   a storage device configured to operate in either of a secure mode and a non-secure mode in response to the secure signal,
   wherein the storage device comprises
   a connector including a plurality of connection terminals connected to the SoC, the plurality of connection terminals including a first terminal corresponding to a second secure signal terminal configured to receive the secure signal, a second terminal configured to receive a logical address from the SoC, and a third terminal configured to receive a digital signature or a password from the SoC,
   a nonvolatile memory including a secure area, which is accessible when the secure signal indicates the secure mode, and a normal area that is accessible when the secure signal indicates the non-secure mode, wherein the secure area is not accessible when the secure signal indicates the non-secure mode, and
   a controller configured to authenticate the SoC when the secure signal indicates the secure mode,
   wherein the controller comprises an address mapping module configured to receive the logical address and the secure signal from the SoC, to generate a first address by combining the logical address and the secure signal, and to map the first address to a second address corresponding to a physical address of the nonvolatile memory, and an authentication module configured to receive the digital signature or the password from the SoC, to authenticate the SoC when the secure signal indicates the secure mode by using the digital signature or the password, and to determine whether to enable access to the secure area, based on a result of the authentication.

10. The electronic device of claim 9, wherein the SoC further comprises a processor configured to be driven by either of a secure operating system (OS) and a non-secure OS based on the secure signal.

11. The electronic device of claim 9, wherein the SoC further comprises:
a first processor configured to be driven by a non-secure operating system (OS) based on the secure signal; and
a second processor configured to be driven by a secure OS based on the secure signal.

12. The electronic device of claim 9, wherein the controller is configured to perform an authentication operation on the SoC when the secure signal indicates the secure mode, and
the controller is configured to not perform the authentication operation on the SoC when the secure signal indicates the non-secure mode.

13. The electronic device of claim 9, wherein the second secure signal terminal is a dedicated terminal configured to receive the secure signal.

14. A method of operating a storage device comprising a plurality of connection terminals connectable to an external device and a nonvolatile memory, the nonvolatile memory including a secure area and a non-secure area, the method comprising:
receiving a secure signal through a first terminal corresponding to a secure signal terminal among the plurality of connection terminals, the secure signal indicating either of a secure mode and a non-secure mode;
receiving a logical address from the external device, through a second terminal among the plurality of connection terminals;
receiving a digital signature or a password from the external device, through a third terminal among the plurality of connection terminals;
controlling access to the nonvolatile memory in response to the secure signal to enable access to the secure area when the secure signal indicates the secure mode, and to enable access to the non-secure area and not enable access to the secure area when the secure signal indicates the non-secure mode;
generating a first address by combining the logical address and the secure signal, and mapping the first address to a second address corresponding to a physical address of the nonvolatile memory; and
authenticating the external device when the secure signal indicates the secure mode by using the digital signature or the password.

15. The method of claim 14, wherein said authenticating the external device is not performed when the secure signal indicates the non-secure mode.

* * * * *